United States Patent
Zhao et al.

(10) Patent No.: US 11,294,716 B2
(45) Date of Patent: Apr. 5, 2022

(54) PROCESSING SYSTEM FOR MANAGING PROCESS AND ITS ACCELERATION METHOD

(71) Applicant: Shanghai Zhaoxin Semiconductor Co., Ltd., Shanghai (CN)

(72) Inventors: Wei Zhao, Beijing (CN); Xuehua Han, Beijing (CN); Fangfang Wu, Beijing (CN); Jin Yu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 262 days.

(21) Appl. No.: 16/558,697

(22) Filed: Sep. 3, 2019

(65) Prior Publication Data
US 2020/0334079 A1 Oct. 22, 2020

(30) Foreign Application Priority Data
Apr. 19, 2019 (CN) .......................... 201910316999.3

(51) Int. Cl.
*G06F 12/02* (2006.01)
*G06F 9/48* (2006.01)
*G06F 9/30* (2018.01)

(52) U.S. Cl.
CPC .......... *G06F 9/4881* (2013.01); *G06F 9/3016* (2013.01)

(58) Field of Classification Search
CPC .... G06F 9/4881; G06F 9/3016; G06F 9/4806; G06F 9/3855; G06F 9/4843; G06F 3/0659; G06F 15/80

USPC .................................. 718/100–108; 712/245
See application file for complete search history.

(56) References Cited

U.S. PATENT DOCUMENTS

| | | | |
|---|---|---|---|
| 7,620,789 B2 | 11/2009 | Jeddeloh | |
| 7,623,134 B1 | 11/2009 | Danilak | |
| 8,190,960 B1 | 5/2012 | Bahadur et al. | |
| 8,707,011 B1 | 4/2014 | Glasco et al. | |

(Continued)

FOREIGN PATENT DOCUMENTS

| | | |
|---|---|---|
| CN | 103778072 A | 5/2014 |
| CN | 104252392 A | 12/2014 |

(Continued)

OTHER PUBLICATIONS

CN107423135_Balancing_device_and_balancing_method_EnglishAbs (English Abstract Translation) (Year: 2017).*

(Continued)

*Primary Examiner* — Cheng Yuan Tseng
(74) *Attorney, Agent, or Firm* — McClure, Qualey & Rodack, LLP

(57) ABSTRACT

A processing system includes at least one core, at least one accelerator function unit (AFU) and an acceleration interface. The unit runs a plurality of processes and develops at least one task queue corresponding to each of the processes. The core generates several command packets and pushes them into the corresponding task queue. The AFU are used to execute the command packets. The acceleration interface is arranged between the AFU and the core to receive an acceleration interface instruction from the processing core, and establish a bit map based on the acceleration interface instruction. The bit map is used to indicate which task queue contains the command packets that have been generated.

18 Claims, 24 Drawing Sheets

(56) References Cited

U.S. PATENT DOCUMENTS

| | | | |
|---|---|---|---|
| 9,678,788 B2 | 6/2017 | Aslot et al. | |
| 9,891,935 B2 | 2/2018 | Teh et al. | |
| 10,268,395 B1 | 4/2019 | Joshua et al. | |
| 10,331,494 B2* | 6/2019 | Qi | G06F 9/5083 |
| 2008/0077928 A1* | 3/2008 | Matsuzaki | G06F 9/5044 |
| | | | 718/104 |
| 2010/0229172 A1* | 9/2010 | Burns | G06F 9/3851 |
| | | | 718/100 |
| 2011/0055515 A1 | 3/2011 | Khubaib et al. | |
| 2011/0161620 A1 | 6/2011 | Kaminski et al. | |
| 2011/0302585 A1 | 12/2011 | Dice | |
| 2012/0254587 A1 | 10/2012 | Biran et al. | |
| 2013/0042250 A1 | 2/2013 | Lim et al. | |
| 2013/0297906 A1 | 11/2013 | Loh et al. | |
| 2014/0122829 A1 | 5/2014 | Barrow-Williams et al. | |
| 2015/0089495 A1 | 3/2015 | Persson et al. | |
| 2015/0128149 A1 | 5/2015 | Meijer et al. | |
| 2015/0205614 A1* | 7/2015 | Lahteenmaki | G06F 9/505 |
| | | | 712/215 |
| 2015/0293720 A1 | 10/2015 | Lam et al. | |
| 2015/0339233 A1 | 11/2015 | Kapil et al. | |
| 2015/0347192 A1 | 12/2015 | Blaine et al. | |
| 2016/0232111 A1* | 8/2016 | Chang | G06F 13/22 |
| 2016/0283278 A1* | 9/2016 | Duran Gonzalez | G06F 9/46 |
| 2017/0046179 A1 | 2/2017 | Teh et al. | |
| 2017/0192921 A1 | 7/2017 | Wang et al. | |
| 2018/0150396 A1 | 5/2018 | Adar et al. | |
| 2018/0253315 A1 | 9/2018 | Norton et al. | |
| 2018/0321880 A1 | 11/2018 | Jung et al. | |
| 2018/0365160 A1 | 12/2018 | Jiang | |
| 2019/0042327 A1 | 2/2019 | Qi et al. | |
| 2019/0073312 A1 | 3/2019 | Hu et al. | |
| 2019/0370005 A1 | 12/2019 | Moloney et al. | |

FOREIGN PATENT DOCUMENTS

| | | | | |
|---|---|---|---|---|
| CN | 105511954 A | | 4/2016 | |
| CN | 105549910 A | | 5/2016 | |
| CN | 106445876 A | | 2/2017 | |
| CN | 107423135 A | | 12/2017 | |
| CN | 107423135 A | * | 12/2017 | G06F 9/5088 |
| CN | 107544926 A | | 1/2018 | |
| CN | 108292239 A | | 7/2018 | |
| EP | 3 131 011 A1 | | 2/2017 | |

OTHER PUBLICATIONS

CN107423135_Balancing_device_and_balancing_method_EnglishTranslation (English Translation of the Description) (Year: 2017).*

Ausavarungnirun, R., et al.; "MASK Redesigning the GPU Memory Hierarchyto Support Multi-Application Concurrency;" Association for Computing Machinery; Mar. 2018; pp. 1-16.

"Cuda C Programming Guide;" NVidia; Apr. 2018; pp. 1-301.

Non-Final office action dated Aug. 31, 2020, issued in U.S. Appl. No. 16/558,637.

Sahita, R., et al.; "Mitigating the Lying-Endpoint Problem in Virtualized Network Access Frameworks;" 2007; pp. 135-146.

* cited by examiner

PROCESSING SYSTEM FOR MANAGING PROCESS AND ITS ACCELERATION METHOD

CROSS REFERENCE TO RELATED APPLICATIONS

This Application claims priority of China Patent Application No. 201910316999.3 filed on Apr. 19, 2019, the entirety of which is incorporated by reference herein.

BACKGROUND OF THE INVENTION

Field of the Invention

The disclosure generally relates to a processing system and its memory access method, and more particularly, to a processing system of a heterogeneous processor, an acceleration method and its memory access method.

Description of the Related Art

Hardware accelerators such as an accelerator function unit (AFU) are used mainly to accelerate specific computing tasks. If these computing tasks are performed by the software of a central processing unit (CPU), efficiency will be reduced. The AFU can analyze the computing process and design specialized hardware logic to deal with the computing tasks so that they may be accelerated. The interface between the AFU and CPU can distribute specific acceleration tasks to the AFU for execution. The AFU in the prior art is directly connected to the main bus and the system memory, which results in two problems: first, the amount of space in system memory that is available to the AFU is fixed; second, the task is usually created while the CPU is in the user mode, but it is distributed to the AFU for execution while in the kernel mode. Therefore, the tasks usually need to be copied from the user space to the kernel space, which requires a context switch operation and uses up too many resources.

In addition, in the current operating system platform of multi-user and multi-tasks, the AFU are required for several applications or executing streams. How to allocate several tasks to the AFU for execution becomes a big issue when designing the interface.

In order to satisfy the need to share the AFU between several applications or executing streams, several AFUs are often arranged in one chip. However, if there is no coordination and distribution among the AFUs, the AFU's task distribution will be unbalanced, and the performance of the AFUs cannot be fully utilized.

Therefore, a design for a new heterogeneous computing processing system is needed to overcome the technical problems of dispatching tasks, as well as of the allocation and distribution of the AFU and CPU as performed using the current level of technology.

BRIEF SUMMARY OF THE INVENTION

In order to solve the aforementioned problem, the invention proposes a processing system and its acceleration method for task dispatching. In the current operating system platform of multi-user and multi-tasks, the AFU are required for several applications or executing streams to meet the requirement of several application programs or the executing streams for hardware acceleration.

In one aspect of the invention, the present invention provides a processing system includes at least one core, at least one accelerator function unit (AFU) and an acceleration interface. The core runs a plurality of processes and develops at least one task queue corresponding to each of the processes. The core generates several command packets and pushes them into the corresponding task queue. The AFU are used to execute the command packets. The acceleration interface is arranged between the AFU and the core to receive an acceleration interface instruction from the core, establish a bit map based on the acceleration interface instruction. The bit map is used to indicate which task queue contains the command packets that have been generated.

In another aspect of the invention, the present invention provides a task dispatching method, which is applicable for at least one core, at least one accelerator function unit (AFU), and an acceleration interface. The task dispatching method includes running a plurality of processes and developing at least one task queue corresponding to each of the processes; generating several command packets and pushes them into the corresponding task queues; receiving an acceleration interface instruction about the task queue from the core; and establishing a bit map based on the acceleration interface instruction, wherein the bit map is used to indicate which task queue contains the command packets have been generated.

Other aspects and features of the present invention will become apparent to those with ordinarily skill in the art upon review of the following descriptions of specific embodiments of the proposed processing system and memory access method.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A is a schematic diagram that illustrates pushing the command packet into a task queue according to an embodiment of the invention;

FIG. 7B is a schematic diagram that illustrates an AFU sequentially executing the command packets according to an embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
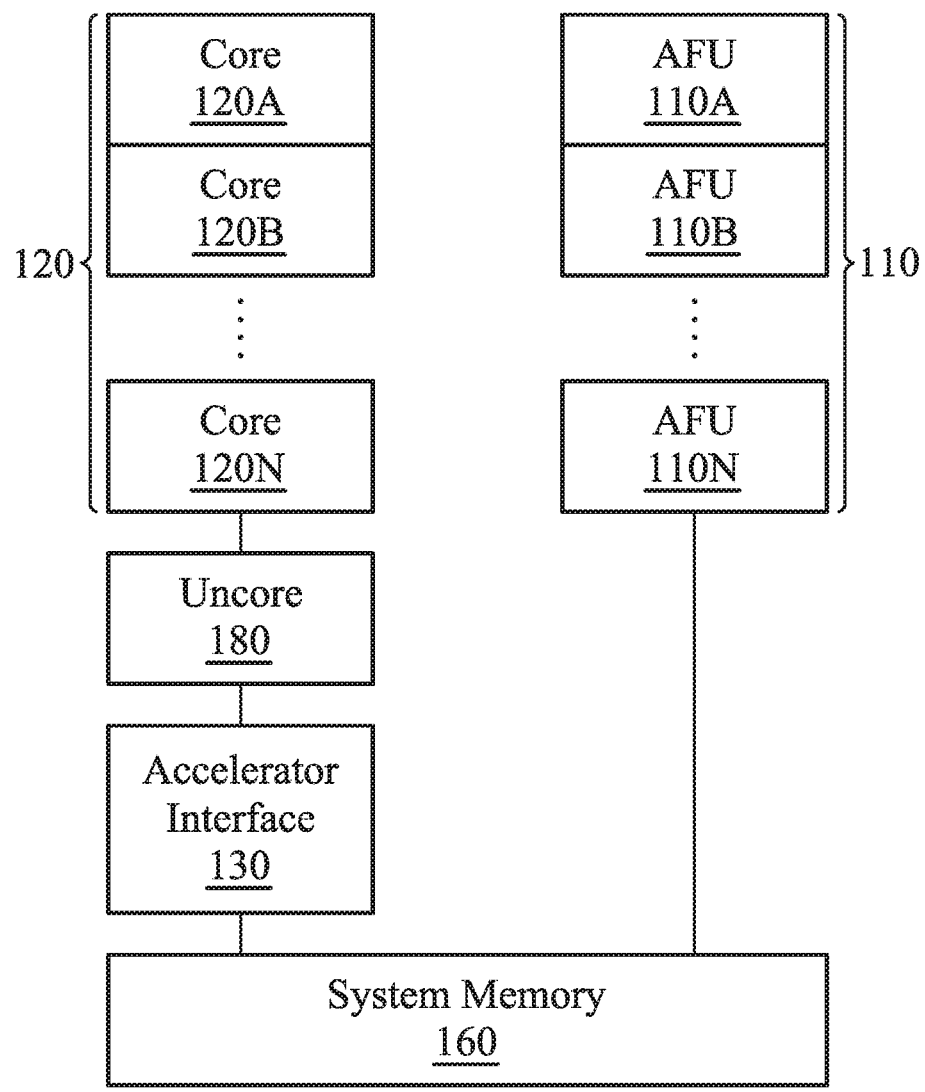
FIG. 1 is a schematic diagram that illustrates a processing system according to an embodiment of the invention.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram that illustrates a processing system 10 according to an embodiment of the invention. The processing system 10 includes at least one accelerator function unit (AFU), at least one core 120A~120N, an accelerator interface 130 and a system memory 160. It should be noted that there may be any number of cores and AFUs, and that they are not required to be identical to each other. As shown in the figures, the accelerator interface 130 is coupled between several AFU 110A~110N and several cores 120A~120N. In one embodiment, the processing system 10 further includes an uncore 180 which is coupled between the accelerator interface 130 and several cores 120A~120N. The processing system 10 can be a partial composition of an electronic device. The above electronic device can be a mobile electronic device such as a cell phone, a tablet computer, a laptop computer or a PDA, or it can be an electronic device such as a desktop computer or a server.

In one embodiment, at least one task is established by at least one core 120A~120N. The AFU 110A~110N is used to execute the above tasks. The AFUs 110A~110B are mainly used to accelerate certain computing tasks. If the computing tasks are processed by the core 120A~120N and its software, efficiency may suffer. The AFUs 110A~110N are used to analyze computing flow and to design specialized hardware logic to deal with the computing tasks for acceleration.

For example, the core 120A~120N and accelerator 110A~110N can include a digital signal processor (DSP), a microcontroller (MCU), a central-processing unit (CPU), or a plurality of parallel processors related to the parallel processing environment to implement the operating system (OS), firmware, driver, and/or other applications of the electronic device. It should be noted that, through the accelerator interface 130 of the present invention, the core 120A~120N can assign the AFU 110A~110N to perform the acceleration operation by using specific commands and without the need for frequent switching between the user mode and the kernel mode.

In one embodiment, corresponding to at least one process operated on the core 120A~120N, the core 120A~120N develops at least one task queue for the above task in system memory 160. For example, these task queues can be created by the driver of AFU 110A~110N according to its corresponding process. Each process can create several task queues, and different processes correspond to different task queues. When a lot of data compression is needed, a process such as compression application can transfer a specific accelerator command, which is specified by the present invention, to inform the accelerator interface 130 to assign a corresponding AFU 110A~110N to execute the acceleration task. Specifically, the task queue includes a header and at least one command packet. The task is implemented using units of command packets. For example, a command packet includes type, length, at least one source address, and at least one target address corresponding to the task. Each command packet is used to describe a task which needs acceleration. Take the acceleration task of compressing data for example: a certain size of source data can be assigned for compression by each command packet. The header is used to store information about the process to which the task queue belongs.

In addition, the accelerator interface 130 is arranged between the core 120A~120N and the AFU 110A~110N to receive an accelerator interface instruction about the task which is transmitted from the core 120A~120N. Afterwards, the accelerator interface 130 indicates the AFU 110A~110N based on the accelerator interface instruction for the AFU 110A~110N to execute the above task. The specialized accelerator instruction format differs based on the instruction set of the core 120A~120N, which can be an X86 instruction or a RISC instruction. The actual function and implementation of the accelerator instruction will be described in more detail below. Specifically, the accelerator interface 130 analyzes the task and dispatches the task to the corresponding AFU 110A~110N according to the features of the task. In one embodiment, the accelerator interface 130 dispatches the command packet of the task queue to one of the AFUs 110A~110N based on information such as type, length, source address, and target address of the command packet. It should be noted that the method of maximizing the overall execution efficiency by dispatching the task to one of the AFUs 110A~110N is illustrated in more detail below. The description here is focused on the general method used by the processing system 10 that includes one or many AFUs 110A~110N.

Figure 2:
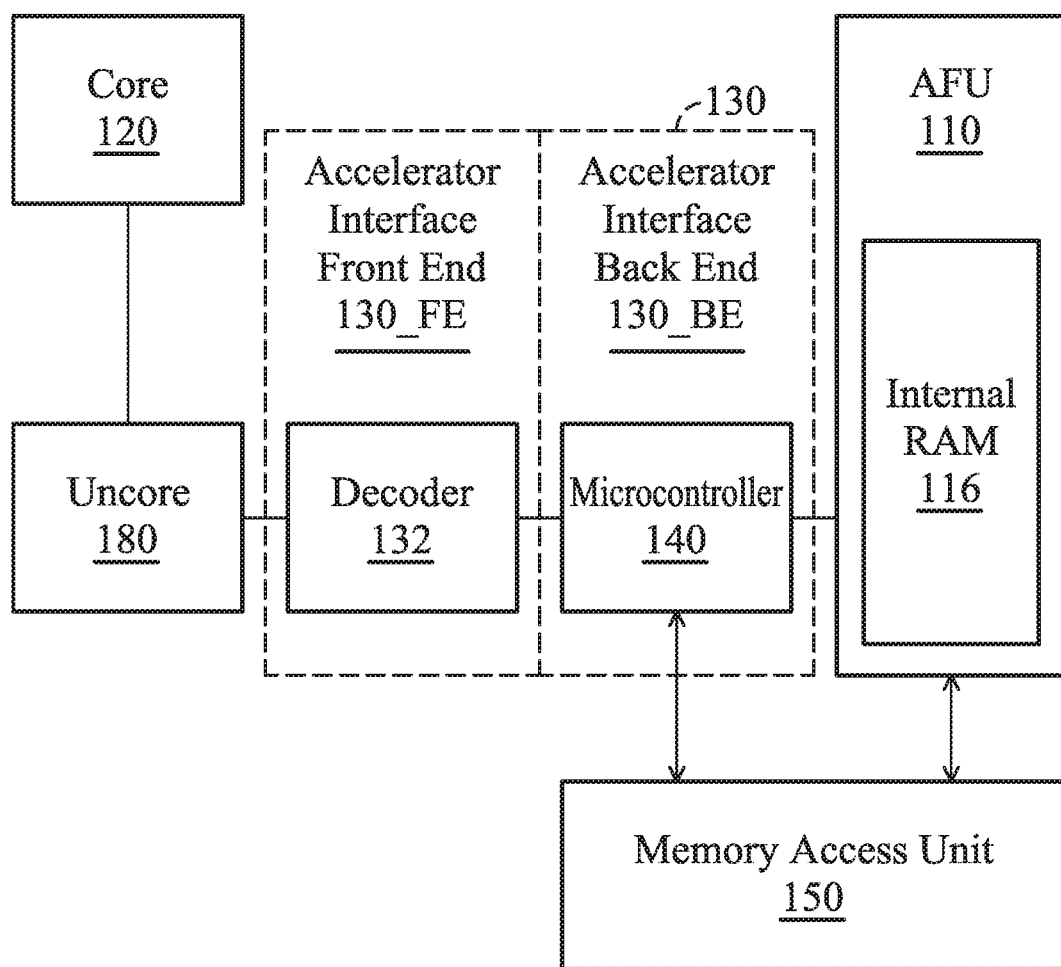
FIG. 2 is a schematic diagram that illustrates a processing system according to another embodiment of the invention.

FIG. 2 is a schematic diagram that illustrates a processing system 10 according to another embodiment of the invention. The accelerator interface 130 includes an accelerator interface front end 130_FE and an accelerator interface back end 130_BE to respectively connect the core 120 (or the uncore 180 in one embodiment such as FIG. 2) and the AFU 110. In one embodiment, the accelerator interface front end 130_FE includes a decoder 132, the accelerator interface back end 130_BE includes a microcontroller 140. The processing system 10 further includes a memory access unit 150 coupled between the AFU 110 and the microcontroller 140 of the accelerator interface 130.

It should be noted that the AFU 110 and the core 120 share a plurality of virtual addresses to perform the memory access. In one embodiment, the core 120 establishes a task and stores it in one of the virtual addresses described above. Specifically, the task is created by the process operating on the core 120 in user mode based on its own acceleration requirements. The task is created by putting a command packet of the task into a task queue corresponding to the process. When a task queue corresponding to the process in system memory 160 does not exist, or the corresponding task queue is full, a task queue which corresponds to the process should be created at a high priority (the following description is about first establishing a task queue). Specifically, the core 120 transmits an acceleration interface instruction ACCIF_CMD of the task to the microcontroller 140, and the microcontroller 140 orders the AFU 110 to execute the task (such as a command packet) based on the acceleration interface instruction ACCIF_CMD. In one embodiment, the first sub-command ACCIF_CMD_Creat_QI (also called a first micro-operation, μ op) of the acceleration interface instruction ACCIF_CMD includes the virtual address in which the task is stored, such as the task queue base address, which is transmitted when the core 120 creates a corresponding task queue. The second micro-operation ACCIF_CMD_New_Packet of the acceleration interface instruction ACCIF_CMD includes the page directory base address, which is transmitted when the core 120 puts the generated command packet into the corresponding task queue.

Afterwards, the decoder 132 of the acceleration interface 130 decodes the acceleration interface instruction ACCIF_CMD and obtains its own carried page directory base address to confirm whether the task was created successfully or not. The microcontroller 140 analyzes the acceleration interface instruction ACCIF_CMD, obtains the virtual address (such as the stored task queue base address) indicating where the task (the command packet) is stored, and dispatches the task to the corresponding AFU 110. It should be noted that in one embodiment, the virtual address of the task queue of the task is stored within the microcontroller 140 when the core 120 creates a task queue in system memory 160 through the acceleration interface instruction ACCIF_CMD (such as the first micro operation ACCIF_CMD_Creat_QI). Afterwards, when a new task is put into the task queue, the corresponding virtual address can be requested directly by the microcontroller 140. The AFU 110 accesses the virtual address through the memory access unit 150, and reads the task description (such as the length/target address/source address of the target data which needs acceleration) of the task to execute the task.

In one embodiment, after the microcontroller 140 analyzes the task, it transmits the virtual address to the AFU 110. The AFU 110 reads the data necessary for executing the task from the system memory 160 based on the virtual address. In another embodiment, the microcontroller 140 analyzes the task, obtains the command packet of the task queue of the task based on the analysis result, and transmits the command packet to the AFU 110 so that the AFU 110 can execute the task.

Figure 3A:
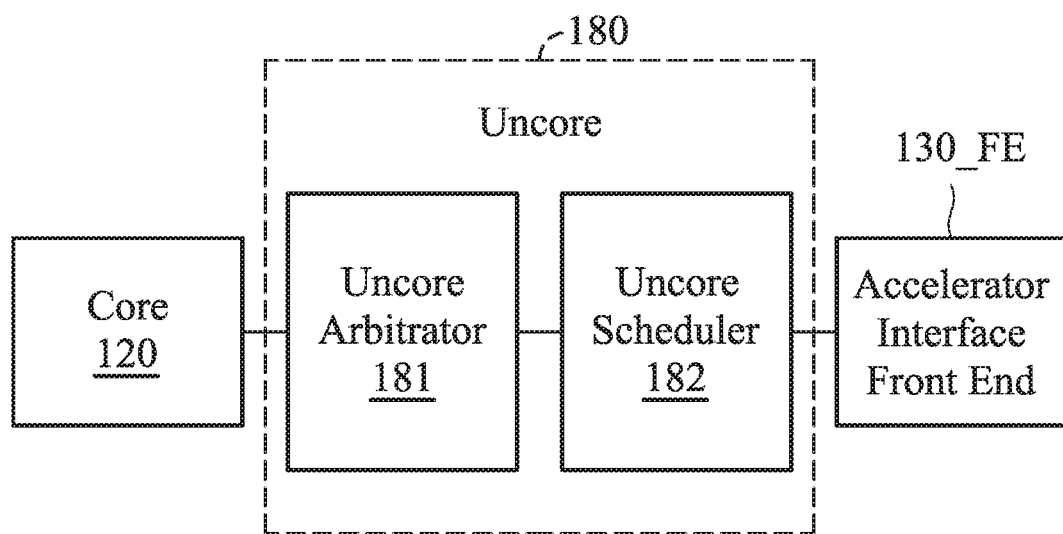
FIG. 3A is a schematic diagram that illustrates a core, an uncore, and the front end of an accelerator interface according to an embodiment of the invention.

FIG. 3A is a schematic diagram that illustrates a core 120, an uncore 180, and the front end of an accelerator interface 130_FE according to an embodiment of the invention. The uncore 180 includes the uncore arbitrator 181 and the uncore scheduler 182 to connect to the core uncore 180 and the acceleration interface front end 130_FE respectively.

When several tasks are created by at least one core 120 at the same time, the uncore arbitrator 181 will dispatch and arbitrate the above tasks and sequentially deal with the multiple tasks from the core 120 to prevent the processing system 10 from poor efficiency and speed delays. Furthermore, the uncore scheduler 182 determines whether the task should be implemented by the AFU 110 or not based on the features or virtual address of the task, in order to determine whether or not the task is transmitted to the acceleration interface front end 130_FE so that the acceleration interface 130 can analyze the task and assign or dispatch the task.

Figure 3B:
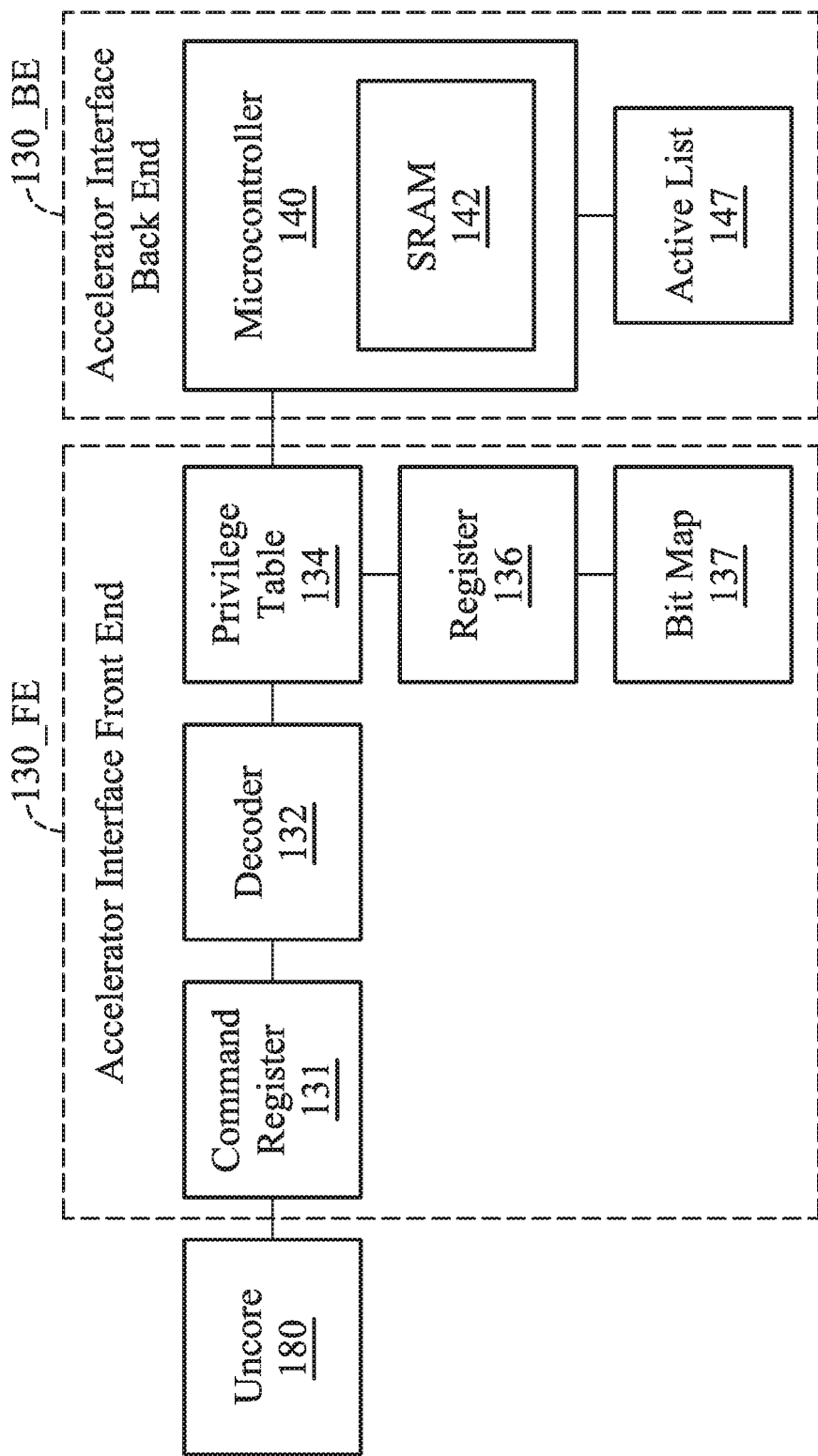
FIG. 3B is a schematic diagram that illustrates an uncore, the front end of an accelerator interface, and the back end of an accelerator interface according to an embodiment of the invention.

FIG. 3B is a schematic diagram that illustrates an uncore 180, the front end of an accelerator interface 130_FE, and the back end of an accelerator interface 130_BE according to an embodiment of the invention. The acceleration interface front end 130_FE includes a command register 131, a decoder 132, a privilege table 134, a register 136 and a bit map 137. The acceleration interface back end 130_BE includes a microcontroller 140 and an active list 147. The microcontroller 140 further includes a static random access memory (SRAM) 142 to access the privilege table 134, the bit map 137 and the active list 147.

In one embodiment, the command register 131 of the acceleration interface 130 is used to store the acceleration interface instruction transmitted by the core 120 through the uncore 180. In one embodiment, when the core 120 establishes a new task queue, it transmits a first micro operation of the acceleration interface instruction which includes the virtual address of the task stored in system memory 160. The core 120 transmits the virtual address to the acceleration interface front end 130_FE through the first micro operation. The core 120 stores the virtual address in an internal microcontroller table of the microcontroller 140 through the acceleration interface 130. Afterwards, when the core 120 develops a task (such as putting a command packet into the task queue) in the task queue, it transmits a second micro operation of the acceleration interface instruction to inform the acceleration interface 130. When the task has set up the privilege successfully (setting up a privilege in a second micro operation is illustrated in more detail below), the microcontroller 140 analyzes the task and its corresponding features and content to dispatch the task to one of the AFUs 110A~110N.

In another embodiment, the second micro operation ACCIF_CMD_New_Packet of the acceleration interface instruction includes a page directory base address to index a page table. Specifically, the page table includes several mapping page table entries between each virtual address and each physical address of the system memory 160. The above page table includes multiple levels (two levels will be used as an example, but are not limited thereto). The page directory base address indicates the storage location of the first level page table (also called the page directory). The physical address space of the system memory 160 is divided into units of pages. For example, each physical page includes 4K bytes, and the virtual address corresponding to each byte includes 32 bits. The high bits (such as 10 high bits) are used to index the first level page table, and each item of the first level page table is directed to the location stored in the corresponding second level page table. The middle bits (such as 10 middle bits) are used to index the second level page table, and each item in the second level page table is directed to the page corresponding to the physical address space of the system memory 160. The low bits (such as 12 low bits) of each virtual address shift at the corresponding pages, and the virtual address can be converted into a physical address by looking up the second level page table. Generally the process on the core 120 cannot be switched, and its corresponding allocated page directory base address in system memory 160 does not change. The page directory base address is usually stored in a page directory base address register (PDBR) within the core 120, which is also called the CR3 control register.

Figure 5:
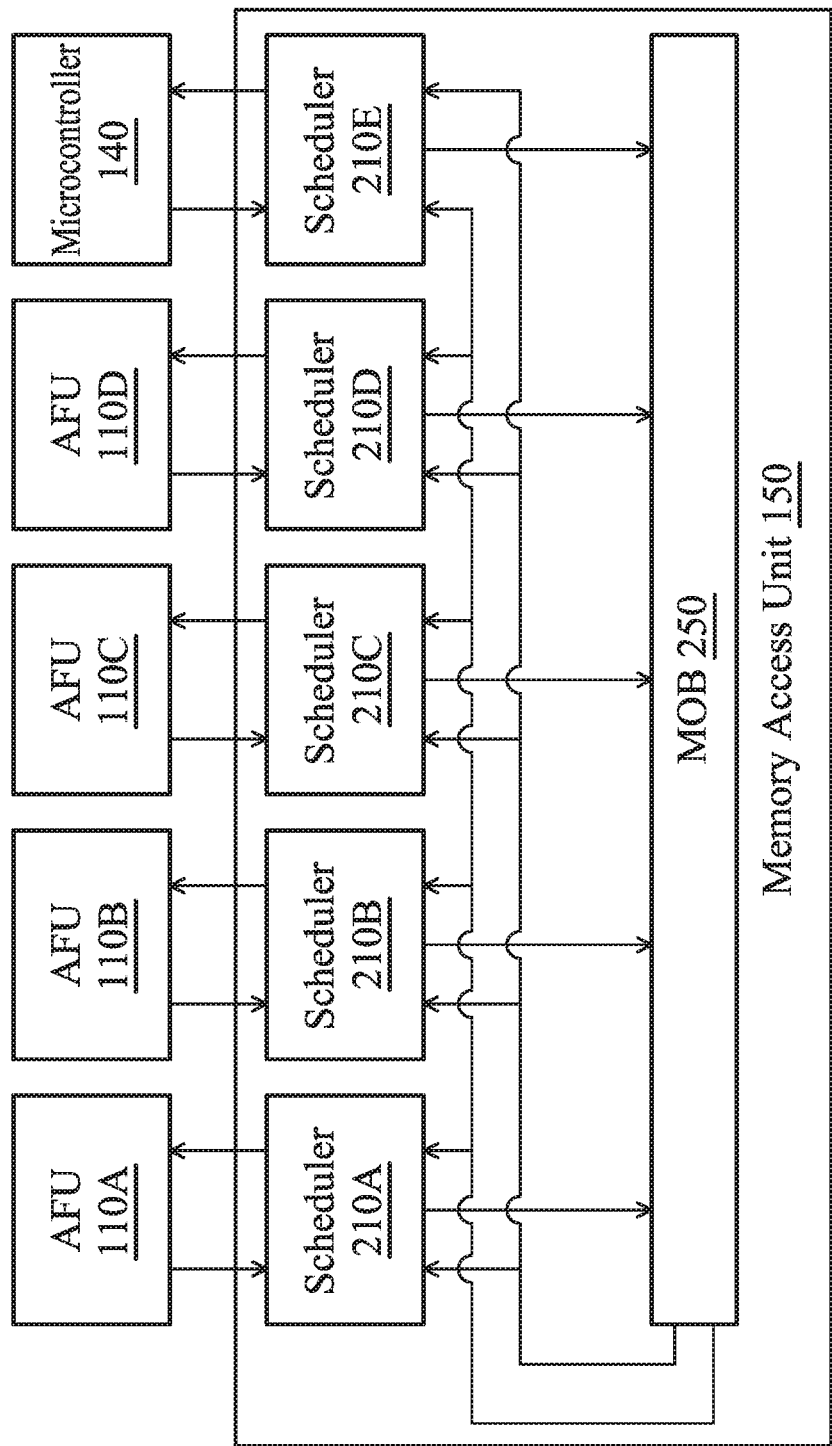
FIG. 5 is a schematic diagram that illustrates an AFU, a microcontroller, and a memory access unit access unit according to an embodiment of the invention.

The acceleration interface 130 compares the page directory base address carried by the second micro operation ACCIF_CMD_New_Packet with a pre-stored page directory base address to confirm whether the task was created successfully or not (which is illustrated in more detail in FIG. 5). If the page directory base address matches the pre-stored page directory base address, it means that the task was created successfully. If the page directory base address does not match the pre-stored page directory base address, it means that the task was not created successfully. It should be noted that the above page directory base address is stored by the core 120 in a privilege table 134 of the accelerator interface 130 in kernel mode. The privilege table 134 stores the pre-stored page directory base addresses of several processes for creating tasks when each process needs to dispatch tasks to an AFU 110 for execution. In other embodiments, the pre-stored page directory base address can also be stored in a microcontroller table of the acceleration interface 130, or stored in system memory 160 of the processing system 10, or stored in the register 136 of the acceleration interface front end 130_FE, which is not limited by the present invention.

When the page directory base address matches the pre-stored page directory base address, the acceleration interface 130 transmits a message to the core 120 indicating that the task has been created successfully and updates the bit map 137 about the task. The bit map 137 is used to indicate which task queue corresponds to the created task. Afterwards, the microcontroller 140 controls the corresponding AFU 110 to read its own corresponding task from the corresponding task queue of the system memory 160 based on the updated bit map 137. In the embodiment wherein the AFU 110 includes several AFUs (such as AFUs 110A~110N in FIG. 1), the acceleration interface 130 identifies the processing that corresponds to the task based on the page directory base address and allocates it to one of the AFUs 110 based on a certain rule (which is illustrated below). When the acceleration interface 130 reads the task from the system memory 160, it schedules the AFU 110 to execute the read task.

In another embodiment, when the AFU 110 executes the task, the AFU 110 informs the core 120 that the task has been executed by interrupt or a memory-access monitor method. Specifically, when the task has been executed, the command complete flag can be written into a specific address in system memory 160 by the AFU 110 or the microcontroller 140, which is the memory-access monitor method of providing this information. In addition, an interrupt notice can also be issued by the AFU 110 or the microcontroller 140 to immediately inform the core 120 that the task has been executed.

Furthermore, in one embodiment, the acceleration interface instruction further includes a third micro operation to delete the task queue of the task. In another embodiment, the acceleration interface instruction further includes a fourth micro operation to develop or arrange the register 136 of the acceleration interface front end 130_FE. The register 136 is used to store the privilege table 134, the bit map 137, the acceleration interface instruction or other data and instructions, which is not limited by the present invention.

Figure 4:
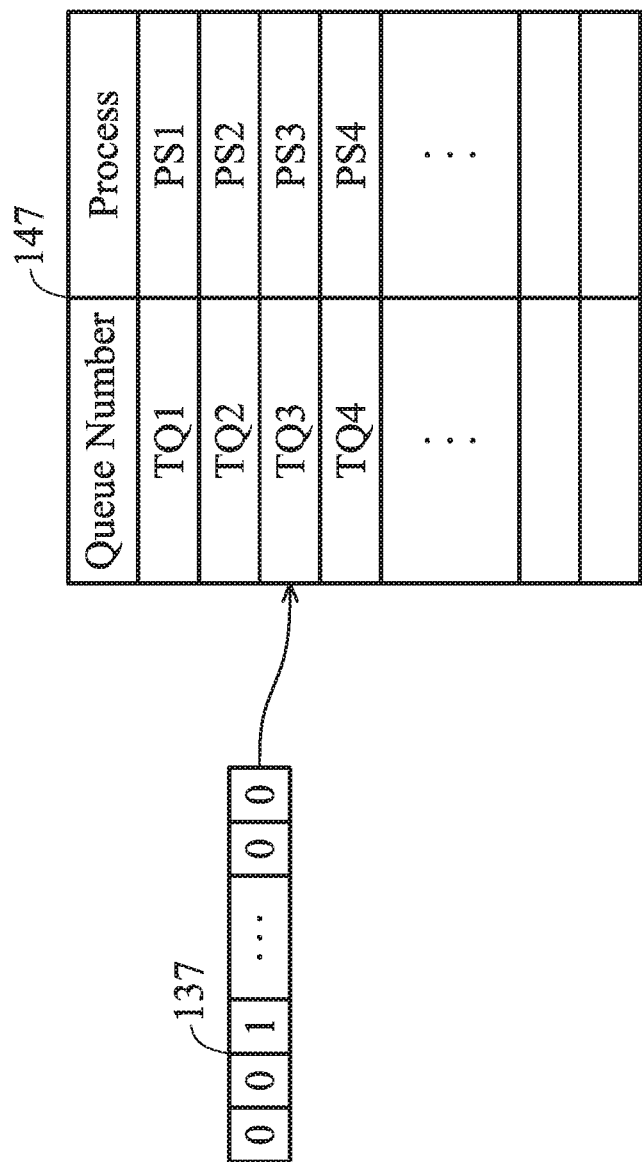
FIG. 4 is a schematic diagram that illustrates a bit map and a microcontroller map according to an embodiment of the invention.

The function and operating method of the bit map 137 are illustrated in the following paragraphs. FIG. 4 is a schematic diagram that illustrates a bit map 137 and an active list 147 according to an embodiment of the invention. When a new task is generated and the page directory base address matches the pre-stored page directory base address to successfully create a task by comparison with the acceleration interface 130, the bit map 137 of the new task will be updated. The above bit map 137 is used to indicate which task queue corresponding to the newly generated task.

As shown in FIG. 4, the active list 147 records several queue numbers TQ1~TQ4 of the task queues and their corresponding processes PS1~PS4. For example, the third bit of the bit map 137 is 1, which means that the task queue of the new task is the task queue with queue number TQ3. The microcontroller 140 can determine, by looking it up in the active list 147, that the task queue with queue number TQ3 corresponds to process PS3. Therefore, the speed of determining the task queue and the process performed by the acceleration interface 130 can be improved by utilizing the bit map 137 to manage various kinds of new tasks and allocate them to the proper AFU 110.

The active list 147 can be stored in the SRAM 142 of the microcontroller 140 or stored in the register 136. It should be noted that the above active list is for illustration, not for limiting the present invention. For example, the microcontroller 140 can use other methods to record and manage the task queue and its corresponding process. In addition, the process and the task queue can have a one-to-one relationship or a one-to-many relationship. In other words, a process can include one task queue or more than two task queues.

FIG. 5 is a schematic diagram that illustrates AFU 110A~110D, a microcontroller 140 and a memory access unit 150 according to an embodiment of the invention. The memory access unit 150 includes several schedulers 210A~210E and a memory reorder buffer (MOB) 250. Four schedulers 210A~210D correspond to four respective AFUs 110A~110D, and the scheduler 210E corresponds to the microcontroller 140. The AFUs 110A~110D and/or the microcontroller 140 and at least one core share several virtual addresses of the processing system 10 for accessing memory (e.g., access the system memory 160) through the memory access unit 150. In other words, the AFUs 110A~110D and the microcontroller 140 correspond to their own exclusive schedulers 210A~210E. The number of schedulers 210A~210E and AFUs 110A~110D illustrated above are used for illustration, not for limiting the present invention.

In one embodiment, each AFU 110A~110D is used to execute at least one of the corresponding tasks, and the analyzed tasks correspond to several memory access requests. Specifically, a task needs to retrieve task-related data from the system memory 160 through several memory access requests. For example, if a task is compressing 4 M of data: Several memory access requests are required to read the data to be compressed in a batch from the system memory 160. After the compression operation is accomplished by the AFU 110A~110D, the compression results are written into the system memory 160 in a batch through several memory access requests. Therefore, when the AFU 110A~110D is assigned to execute a certain task, a plurality of memory access requests are generated by the AFU 110A~110D based on the task, and the data corresponding to the memory access request is stored in the virtual addresses. In addition, when the microcontroller 140 assigns the task to one of the corresponding AFUs 110A~110D, several memory access requests need to be generated so that the task itself can be retrieved from the system memory 160 (the virtual address of the task in system memory 160 is determined by the task queue base address included in the first micro-operation). The schedulers 210A~210E are coupled to the AFU 110A~110D and the microcontroller 140 to respectively schedule several memory access requests which are generated by the AFU 110A~110D and the microcontroller 140 and to sequentially transmit the results of the memory access requests to the AFU 110A~110D and the microcontroller 140. It should be noted that the above task-related data and the task itself are stored in the above virtual address of the virtual address space which is shared by the core 120, the AFU 110A~110D and the microcontroller 140. It should be noted that the physical address space which is mapped by the shared virtual address space belongs to the system memory 160. The system memory 160 can also include a multi-level cache, such as the L1 cache and the L2 cache, which is not limited.

Furthermore, a translation look aside buffer (TLB) is used by the memory access unit 150 to temporarily store several page table entries in a page table which are the most likely to be used by several AFUs 110A~110F during accessing the system memory 160. Each page table entry of the page table is used to store a mapping between a virtual address and a physical address. Because the AFU 110A~110D and the microcontroller 140 share the virtual address space, the data of tasks of different AFUs 110A~110D and/or microcontroller 140 correspond to the same virtual address space (such as 4G). However, the physical address mapped by the identical 4G virtual address space of different AFU 110A~110D and/or microcontroller 140 are different. In order to differentiate the identical virtual address of the AFU 110A~110D and the microcontroller 140, each page table entry stored by the TLB of the present invention has a first identification code to indicate the page table entry corresponding to one of the AFUs 110A~110D and/or the microcontroller 140. Each of the memory access requests has a second identification code to indicate the memory access request corresponding to one of the AFUs 110A~110D and/or the microcontroller 140. The memory access request can evaluate whether or not the second identification code matches the first identification code of the page table entry to determine whether the page table entry belongs to the mapping relationship of the 4G virtual address space of its own corresponding AFU 110A~110D and/or microcontroller 140 to determine whether to use the page table entry or not. In addition, if the memory access unit 150 does not successfully execute the corresponding memory access request by the corresponding page table entry (which is called TLB miss), the memory access unit 150 executes the memory-accessing operation using the corresponding tablewalk engine of the AFU 110A~110D and/or microcontroller 140 based on the second identification code to load the corresponding page table entry from the system memory 160 to the TLB. Therefore, in one embodiment of the present invention, the identification codes are arranged at each page table entry and memory access request in order to identify whether or not the page table entry belongs to the mapping relationship of its own corresponding virtual address space. In addition, a tablewalk operation can be executed when the memory access unit 150 does not perform the memory access request successfully. The tablewalk operation is illustrated in more detail in FIG. 6.

Furthermore, if the memory access unit 150 executes the memory access request successfully and generates a corresponding access result, the schedulers 210A~210E schedule the above memory access requests based on the receiving sequence of the memory access requests corresponding to the tasks from the AFU 110A~110D and/or microcontroller 140. Afterwards, the memory access unit 150 transmits the results of the memory access requests based on the sequence to the corresponding AFU 110A~110D and/or microcontroller 140. Accordingly, even though there are many complicated tasks, the access result of each task can be transmitted to a corresponding AFU 110A~110D and/or microcontroller 140 by utilizing the scheduling and dispatching function of the scheduler 210A~210E.

Figure 6:
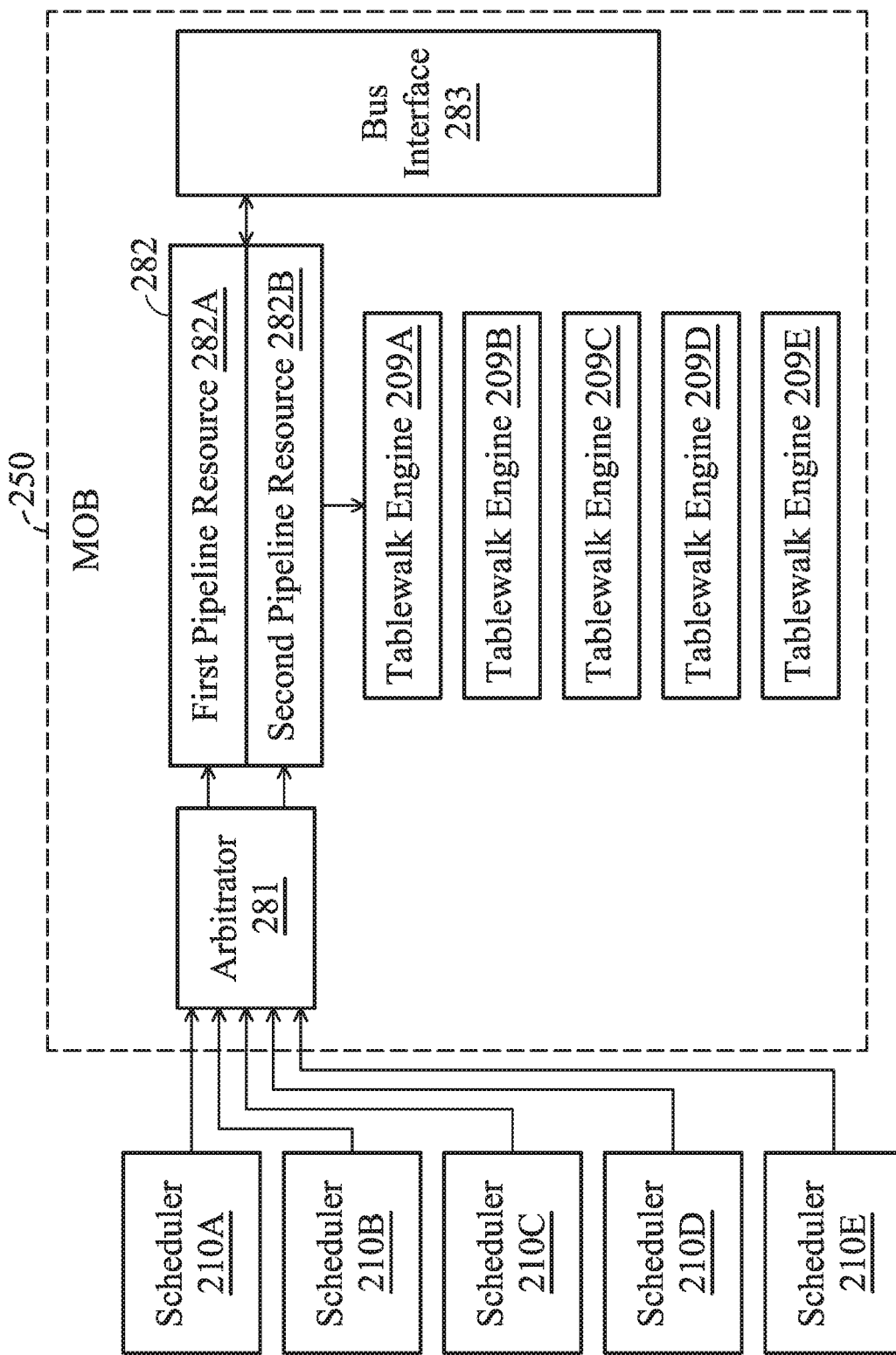
FIG. 6 is a schematic diagram that illustrates a scheduler and a memory re-order buffer according to an embodiment of the invention.

FIG. 6 is a schematic diagram that illustrates a scheduler 210A~210E and a memory reorder buffer 250 according to an embodiment of the invention. The MOB 250 includes an arbitrator 281, a pipeline resource 282, a bus interface 283 and several tablewalk engines 209A~209E. Each tablewalk engine 209A~209E corresponds to one of the schedulers 210A~210E respectively.

The pipeline resource 282 includes a first pipeline resource 282A and a second pipeline resource 282B to execute different memory access requests in return. The arbitrator 281 is coupled between the schedulers 210A~210E and the pipeline resource 282 to arbitrate and determine the execution sequence of the memory access requests. Afterwards, the memory access requests are sequentially transmitted to the first pipeline resource 282A or the second pipeline resource 282B.

Specifically, the arbitrator 281 selects one of the schedulers 210A~210E of the AFU 110A~110D and the microcontroller 140 (the microcontroller 140 also has its own corresponding access request, such as a reading task) using the round-robin method at each clock period, and transmits one of the memory access requests corresponding to the selected scheduler to the pipeline resource 282. Accordingly, the AFU selected by the 281 executes the memory access request to read the data related to the task through the first pipeline resource 282A or the second pipeline resource 282B. In other words, at each clock period, the arbitrator 281 selects the memory access request of one of the schedulers 210A~210E and transmits it to the pipeline resource 282 for execution.

In one embodiment, the arbitrator 281 uses the round-robin method, which means inquiring and assigning each scheduler 210A~210E to sequentially transmit a memory access request from the corresponding AFU and/or microcontroller 140 to the pipeline resource 282. The first pipeline resource 282A or the second pipeline resource 282B is used to execute a memory access request to read or write task-related data. Therefore, each scheduler 210A~210E can have an equal opportunity to execute its own corresponding memory access request.

Afterwards, the pipeline resource 282 receives and executes memory several access requests which are transmitted by the schedulers 210A~210E. After the memory access requests have been executed, the execution results of the memory access requests are transmitted by each scheduler 210A~210E to the corresponding AFU 110A~110D and/or microcontroller 140 based on the original sequence of the memory access requests. The AFU 110A~110D can execute the corresponding task based on the memory access result (such as based on the data to be compressed which is read by the memory access request).

As illustrated above, each memory access request has a second respective identification code. In one embodiment, the arbitrator 281 can transmit each corresponding memory access request to the first pipeline resource 282A or the second pipeline resource 282B by determining whether the second identification code is odd or even. In other embodiments, the arbitrator 281 can transmit each corresponding memory access request to the first pipeline resource 282A or the second pipeline resource 282B by determining whether the sequence number of the memory access request at each respective scheduler 210A~210E is odd or even, which is not limited by the present invention. When the number of memory access requests increases, more than 3 pipeline resources can be arranged to avoid delays or impacting computing performance.

In another embodiment, the TLB is used by the memory access unit 150 to temporarily store the page table entries which are the most likely to be used by the AFU during accessing memory (e.g., the system memory 160). If the memory access unit 150 does not execute the corresponding memory access request successfully through the corresponding page table entry (TLB miss), the second identification code carried by the memory access request can be used to identify the corresponding tablewalk engine 209A~209E since each one of the tablewalk engines 209A~209E corresponds to the respective one of AFUs 110A~110D and microcontroller 140. The memory access unit 150 can perform the tablewalk operation using the tablewalk engine 209A~209E that corresponds to the second identification code directly based on the second identification code carried by the memory access request. The corresponding tablewalk engine 209A~209E loads the corresponding page table entry from the system memory 160 of the processing system 10 according to the page directory base address and the virtual address included in the memory access request through a multi-level table address.

In addition, when the corresponding tablewalk engine 209A~209E loads a corresponding page table entry from system memory 160, the corresponding tablewalk engine 209A~209E puts the second identification code of the memory access request at the loaded page table entry as the first identification code of the page table entry to represent the one of the scheduler 210A~210E that corresponds to the page table entry (i.e., the corresponding one of AFU 110A~110D and/or microcontroller 140) and to represent whose mapping relationship the page table entry belongs to the AFU 110A~110D and/or microcontroller 140. It should be noted that each AFU 110A~110D and/or microcontroller 140, and its corresponding one of scheduler 210A~210E, and its corresponding tablewalk engine has the same page directory base address.

The method of dispatching and allocating several command packets to AFU 110 for execution is illustrated in detail below. Now referring to FIG. 1, in the embodiment wherein the AFU 110 includes several AFUs 110A~110N, the acceleration interface 130 (or the microcontroller 140 of FIG. 2) is coupled between the AFU 110 and the core 120 to dispatch several command packets to a corresponding AFU 110A~110N for execution. When any one of the AFUs 110A~110N executes at least one command packet of several processes, the acceleration interface 130 (or the microcontroller 140) assigns the AFU 110 to execute other command packets of the task queues of the same process at a high priority.

Specifically, the acceleration interface 130 (or microcontroller 140) arranges a time slice for each respective task queue corresponding to each AFU 110A~110N, and dispatches the command packets to an AFU whose time slice of the task queue to which the command packet belongs is not zero using the round-robin method. After the AFU executes the command packets, the acceleration interface 130 (or microcontroller 140) decrements the time slice of the AFU of the task queue of the command packet.

When the time slice is reduced to 0 or there is no new command packet pushed in the task queue of the executed command packet, the microcontroller 140 inquires into which process the executed command packets belongs to and assigns the AFU 110 to execute the command packets of other task queues that correspond to the same process. In other words, the microcontroller 140 executes the command packets of the task queue belonging to the same process at a high priority, so as to reduce the number of times of the switching operations switching to other processes, in order to avoid delaying the processing time. The process information of one of the tasks (the command packet) is stored in the header of the task queue where the task stores.

It should be noted that each AFU 110A~110N arranges a time slice for each respective task queue. The time slice of each task queue is independent of the others. Therefore, an AFU 110 can simultaneously have several time slices for different task queues. By arranging time slices for several task queues and executing the round-robin method, the command packets of several task queues can be equally distributed and dispatched to avoid over-distributing and executing a certain portion of task queues and ignoring another portion of the task queues. It should be noted that the arrangement of the round-robin method and the time slices for several task queues is applicable to a processing system 10 with several AFUs 110A~110D, but will not be limited.

It can also be applied in a processing system 10 that includes only one AFU 110 for dispatching the command packets of several task queues (or processes).

In another embodiment, when several command packets executed by any one of the AFUs 110A~110D have relevance, the microcontroller 140 assigns the AFU to execute other command packets having the relevance at a high priority. For example, when several continuous command packets are used to compress data of the same file, the above command packets have the relevance. Specifically, when a command packet and its previous command packets correspond to the same context information, the above command packets have the relevance. Afterwards, the context information is used by the AFU 110 to execute the relevant command packet. The context information can be stored temporarily in the internal RAM 116 of the AFU 110.

In addition, when the command packets do not have relevance, the microcontroller 140 accesses the system memory 160 of the processing system 10 to execute the context-save operation or the context-restore operation. In other words, the microcontroller 140 obtains and stores the corresponding context information in system memory 160 or in the internal RAM 116. Furthermore, the above command packet further includes a dependent start indication and a dependent end indication to represent the beginning and end of the relevance.

Therefore, the microcontroller 140 can determine whether the relevance of the command packets finishes based on the dependent start indication and the dependent end indication. In one embodiment, when the time slice is reduced to 0 but the relevance of the command packets is not at an end, the microcontroller 140 increments N for the time slice, wherein N is a positive integer greater than 1. In other words, the microcontroller 140 keeps dispatching the relevant command packets until the relevance ends.

Figures 7A, 7B:
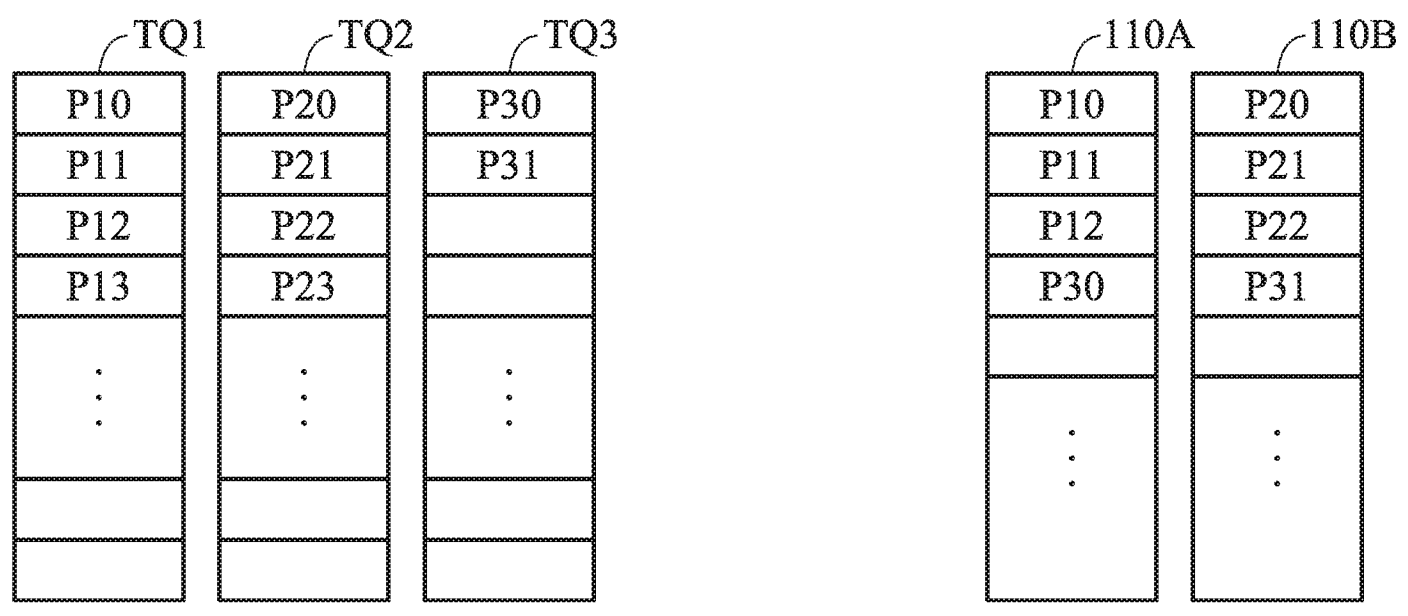

The method of dispatching multiple command packets to the AFU for executing the command packets is illustrated with detailed embodiments below. FIG. 7A is a schematic diagram that illustrates pushing the command packets P11~P31 into task queues TQ1~TQ3 according to an embodiment of the invention; FIG. 7B is a schematic diagram that illustrates two AFUs 110A and 110B sequentially executing the command packets P11~P31 according to an embodiment of the invention.

As shown in FIG. 7A, the task queue TQ1 includes 4 command packets P10~P13, the task queue TQ2 includes 4 command packets P20~P23, and the task queue TQ3 includes 2 command packets P30~P31. In addition, the 3 task queues TQ1~TQ3 belong to different processes, and the initial value of the time slice is 3. First, the microcontroller 140 respectively dispatches the command packets P10~P13, P20~P23 of the task queues TQ1 and TQ2 to the AFU 110A and 110B. Whenever the AFU 110A and 110B executes a command packet, the value of the time slice of the task queues TQ1 and TQ2 will be decremented.

Because the initial value of the time slice is 3, when the AFU 110A executes 3 command packets P10~P12, the value of the time slice of the corresponding task queue TQ1 is zero. Therefore, the microcontroller 140 will distribute the command packet of other task queues to the AFU 110A which belong to the same process of the task queue TQ1. Similarly, when the AFU 110B executes 3 command packets P20~P22, the value of the time slice of the corresponding task queue TQ2 is 0. Therefore, the microcontroller 140 will distribute the command packet of other task queues to the AFU 110A which belong to the same process of the task queue TQ2.

Regarding the AFU 110A, the process of task queues TQ2 and TQ3 is different from the process of task queue TQ1. Therefore, the microcontroller 140 can assign the command packets of task queue TQ2 or TQ3 to the AFU 110A. However, because the time slice of task queue TQ2 corresponding to AFU 110B has been reduced to 0, the microcontroller 140 dispatches the command packet of task queue TQ3 to the AFU 110A based on the round-robin method, and it does not dispatch the command packet of task queue TQ2 to the AFU 110A.

Similarly, regarding the AFU 110A, because the time slice of task queue TQ1 corresponding to AFU 110A has been reduced to 0, the microcontroller 140 dispatches the command packet of task queue TQ3 to the AFU 110B based on the round-robin method, and it does not dispatch the command packet of task queue TQ1 to the AFU 110B. Therefore, as shown in FIG. 7B, the AFU 110A executes the 4 command packets P10~P12 and P30 sequentially, and the AFU 110B executes the 4 command packets P20~P22 and P31 sequentially.

Figure 8A:
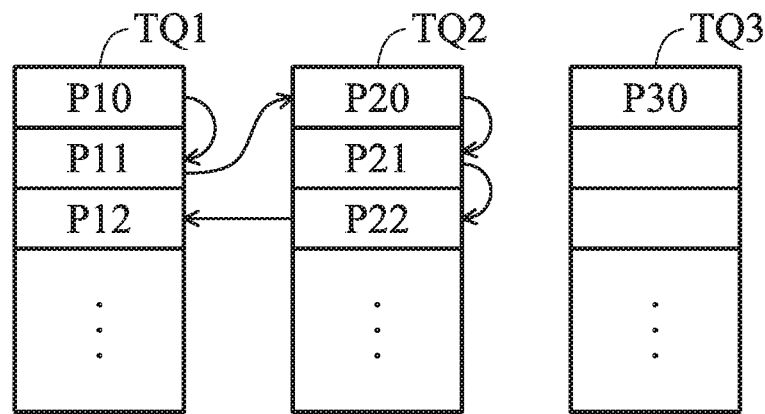
FIG. 8A is a schematic diagram that illustrates executing command packets of different task queues according to an embodiment of the invention.

FIG. 8A is a schematic diagram that illustrates executing command packets of different task queues TQ1~TQ3 according to an embodiment of the invention. In the embodiment, the two task queues TQ1 and TQ2 belong to process A, and task queue TQ3 belongs to process B, which is different from process A. As shown in the figure, the microcontroller 140 dispatches the command packets P10 and P11 of the task queue TQ1 in sequence, and the time slice corresponding to the task queue TQ1 has been reduced to 0. Therefore, the microcontroller 140 distributes the command packets P20~P22 of another task queue TQ2 of the same process A.

Afterwards, the time slice corresponding to the task queue TQ2 has been reduced to 0. Because process B of task queue TQ3 is different from process A, the microcontroller 140 will distribute the command packet P12 of task queue TQ1 of process A. Specifically, the time slice corresponding to the task queue TQ1 has been reduced to 0, the microcontroller 140 increments the time slice of the task queue TQ1 by 1 (which refers to the number of command packets which have not been dispatched) to assign the command packet P12 of the task queue TQ1 of the process A. In addition, in another embodiment, if the relevance of the command packets P10~P12 does not end, the microcontroller 140 can also increments the time slice of the task queue TQ1 by 1 (which refers to the number of command packets that are relevant) to assign the command packet P12 of task queue TQ1 of process A.

Figure 8B:
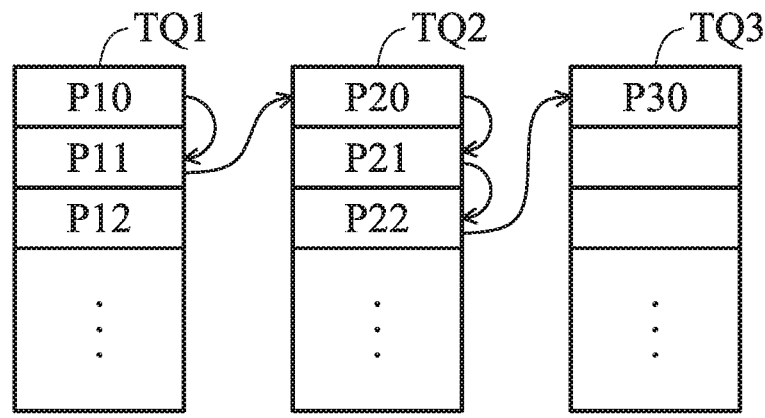
FIG. 8B is a schematic diagram that illustrates executing command packets of different task queues according to another embodiment of the invention.

FIG. 8B is a schematic diagram that illustrates executing command packets of different task queues TQ1~TQ3 according to another embodiment of the invention. The embodiment is similar to the embodiment of FIG. 8A, but the 3 task queues belong to process A. Therefore, after the microcontroller 140 dispatches the command packets P20~P22 of task queue TQ2 of process A, it can dispatch the command packet P30 of another task queue TQ3 of process A to prevent task queue TQ3 from waiting for a long time.

Figure 9:
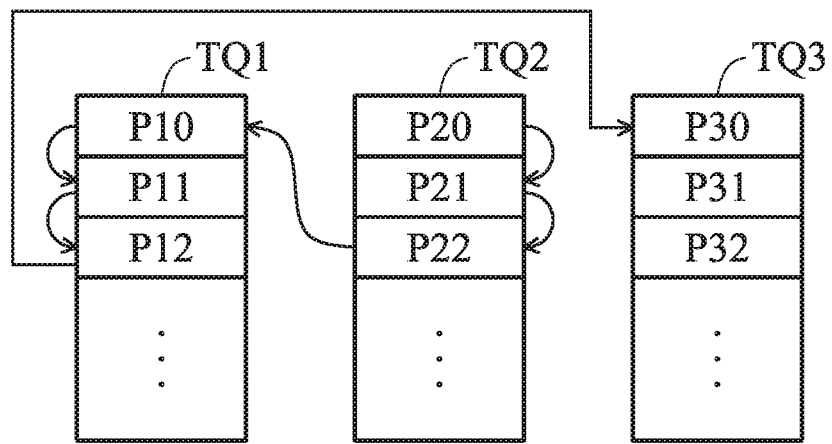
FIG. 9 is a schematic diagram that illustrates executing command packets of different task queues according to another embodiment of the invention.

FIG. 9 is a schematic diagram that illustrates executing command packets of different task queues TQ1~TQ3 according to another embodiment of the invention. In the embodiment, process A includes task queue TQ2, another process B includes task queues TQ1 and TQ3, the command packets P10~P12 of task queue TQ1 are relevant, and the command packets P20~P22 of task queue TQ2 are not relevant. Because process A, which corresponds to task queue TQ2, is different from process B, which corresponds to task queues TQ1 and TQ3, if the time slice of task queue TQ2 has not been reduced to 0, the microcontroller 140 will dispatch all command packets of the task queue TQ2 and then assign the task queue of other processes.

After the microcontroller 140 assigns the command packets P20~P22 of the task queue TQ2, it will assign the command packets P10~P12 of the task queue TQ1 of another process B. It should be noted that because the command packets P10~P12 of the task queue TQ1 are relevant, when the relevant command packets P10~P12 have been distributed, the microcontroller 140 will distribute the irrelevant command packets P30~P32 of another task queue TQ3 of the same process A.

Figure 10:
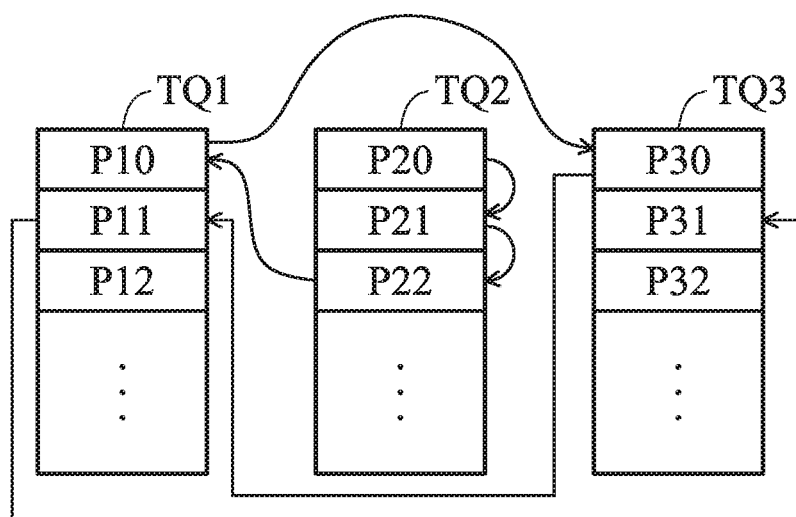
FIG. 10 is a schematic diagram that illustrates executing command packets of different task queues according to another embodiment of the invention.

FIG. 10 is a schematic diagram that illustrates executing command packets of different task queues TQ1~TQ3 according to another embodiment of the invention. The embodiment is similar to the embodiment of FIG. 9, but the command packets P10~P12 of the task queue TQ1 are not relevant. Therefore, after the microcontroller 140 dispatches the command packet P10 of the task queue TQ1, it can dispatch other irrelevant command packets which belong to the same process. Therefore, the microcontroller 140 dispatches the command packet P30 of the task queue TQ3 of the process B based on the round-robin method, and it does not dispatch the command packet P11 of the task queue TQ1. Afterwards, the microcontroller 140 further dispatches the command packet P11 of the task queue TQ1 of the process B based on the round-robin method.

The method of dispatching and distributing command packets through the reorder buffer with the bit map 137 and the active list 147 is illustrated below. In one embodiment, the acceleration front end 130_FE receives and decodes the acceleration interface instruction to set up the bit map 137. Specifically, the acceleration interface instruction is the second micro operation ACCIF_CMD_New_Packet, which is generated by the core 120 when it generates and pushes the new command packet into the corresponding task queue.

Afterwards, the acceleration back end 130_BE updates the active list 147 based on the bit map 137, selects one of the command packets from one of the task queues based on the active list 147, and dispatches the selected command packet to the corresponding AFU 110. It should be noted that the bit map 137 is used to indicate the task queue which contains the newly generated command packets. The active list 147 is used to indicate which task queue has the command packets, which means that the task queue is not empty. In addition, as shown in the active list of FIG. 4, the active list 147 can be used to indicate which process corresponds to the task queue having the above command packets. In other words, the task queue of the process is not empty, and it has at least one command packet.

After the above selected command packets are dispatched to the corresponding AFU 110, they will not be executed immediately. Even if they are executed immediately, the time it takes for the AFU 110 to execute each command packet is different. Therefore, command packets which are dispatched earlier might be accomplished later. In another embodiment, a reorder buffer (ROB) can be arranged so that each task queue (not shown) can schedule the command packets in the original sequence of the command packets in each task queue. Afterwards, the acceleration interface 130 returns the command packets—those which have been executed by the AFU 110—to the core 120 based on the original sequence. Because the time it takes the AFU 110 to execute each command packet is different, the execution results of each command packet can be returned to the core 120 based on the original sequence by utilizing the ROB to avoid mistakes due to an inconsistent sequence. In addition, the ROB can be stored in the SRAM 142 of the acceleration interface 130.

Accordingly, when the acceleration interface 130 dispatches several command packets to several AFUs 110 for simultaneous execution, the acceleration interface 130 returns the executed command packets simultaneously to the core 120 according to the original sequence of the packets in the task queue. Specifically, the ROB further includes a release indicator and a return indicator. The release indicator is used to indicate the next command packet to be dispatched to the AFU 110, and the return indicator is used to indicate the next command packet to be returned to the core 120. Furthermore, the ROB stores a complete flag corresponding to each command packet to indicate whether the execution of each corresponding command packet has been completed or not.

FIGS. 11A~11D are schematics of a reorder buffer and its related release indicator PIN, return indicator PRT, and complete flags C00~C05, according to an embodiment of the invention. In the embodiment, several entries of the ROB have several complete flags C00~C05 to indicate whether the execution of the corresponding command packets have been completed or not. The bit 0 means that the execution of the corresponding command packet has not been completed, and the bit 1 means that the execution of the corresponding command packet has been completed.

Figures 11A, 11B, 11C, 11D:
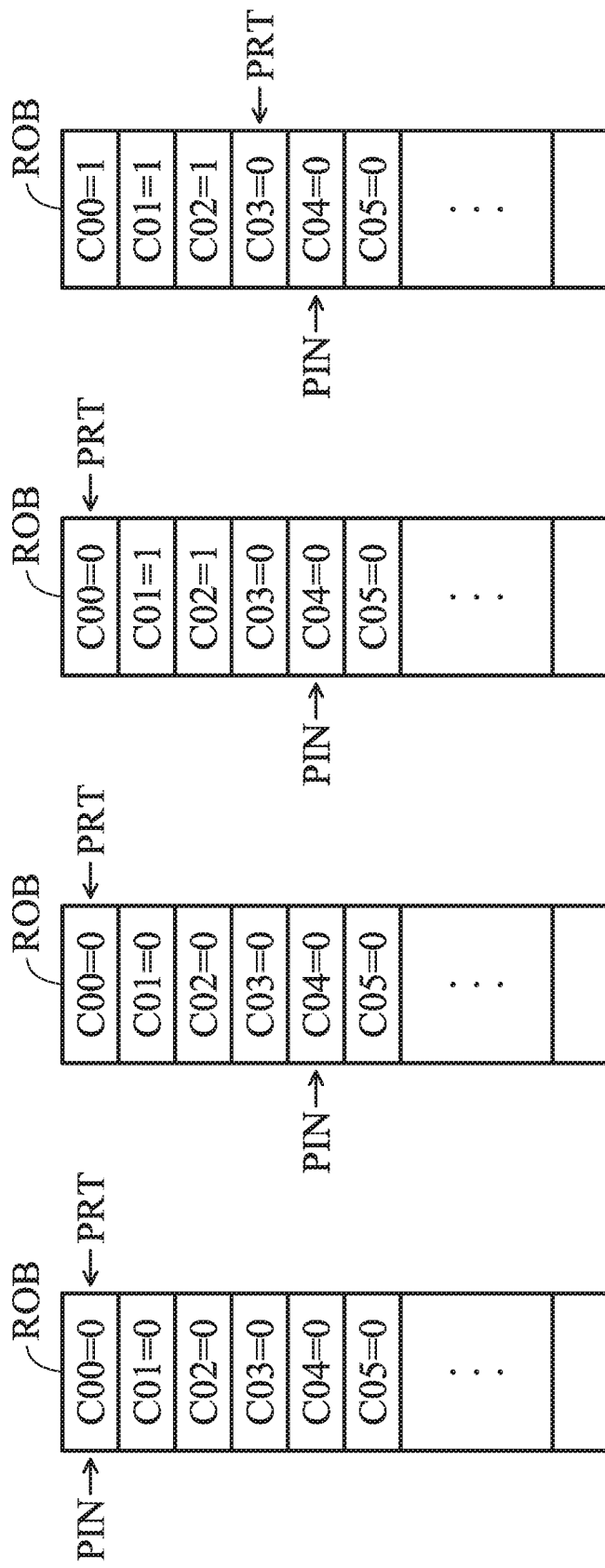
FIG. 11A is a schematic diagram that illustrates a reorder buffer and its related release indicator, return indicator and complete flag according to an embodiment of the invention.
FIG. 11B is a schematic diagram that illustrates a reorder buffer and its related release indicator, return indicator and complete flag according to another embodiment of the invention.
FIG. 11C is a schematic diagram that illustrates a reorder buffer and its related release indicator, return indicator and complete flag according to another embodiment of the invention.
FIG. 11D is a schematic diagram that illustrates a reorder buffer and its related release indicator, return indicator and complete flag according to another embodiment of the invention.

Firstly in FIG. 11A, all command packets P00~P05 have not been dispatched and executed, and therefore their corresponding complete flags C00~C05 are all 0. The release indicator PIN and the return indicator PRT point to the first entry of the ROB, which is the entry corresponding to the command packet P00.

Afterwards, in FIG. 11B, the microcontroller 140 distributes the command packets P00~P03 to the AFU 110, but the AFU 110 has not finished the execution. Therefore, the complete flags C00~C03 are 0, but the release indicator PIN points to the corresponding entry of the command packet P04 to indicate that the next one to be dispatched to the AFU 110 for execution is the command packet P04.

Afterwards, in FIG. 11C, the execution of the command packets P01 and P02 have been completed, and their corresponding complete flags C01 and C02 are 1 while other complete flags are still 0. It should be noted that because the complete flag C00 of the first entry of the ROB (the corresponding entry of the command packet P00) is 0, therefore, the microcontroller 140 cannot return the executed command packets P01 and P02 to the core 120 based on the original sequence.

Afterwards, in FIG. 11D, the execution of the command packet P00 has been completed, and its corresponding complete flag C00 is 1 accordingly. Because the first complete flag C00 of the ROB is 1, therefore, the microcontroller 140 returns the executed command packets P01 and P02 to the core 120 based on the original sequence. Furthermore, the return indicator PRT points to the corresponding entry of the command packet P03 to indicate that the next one to be returned to the core 120 is the command packet P03.

Figure 12A:
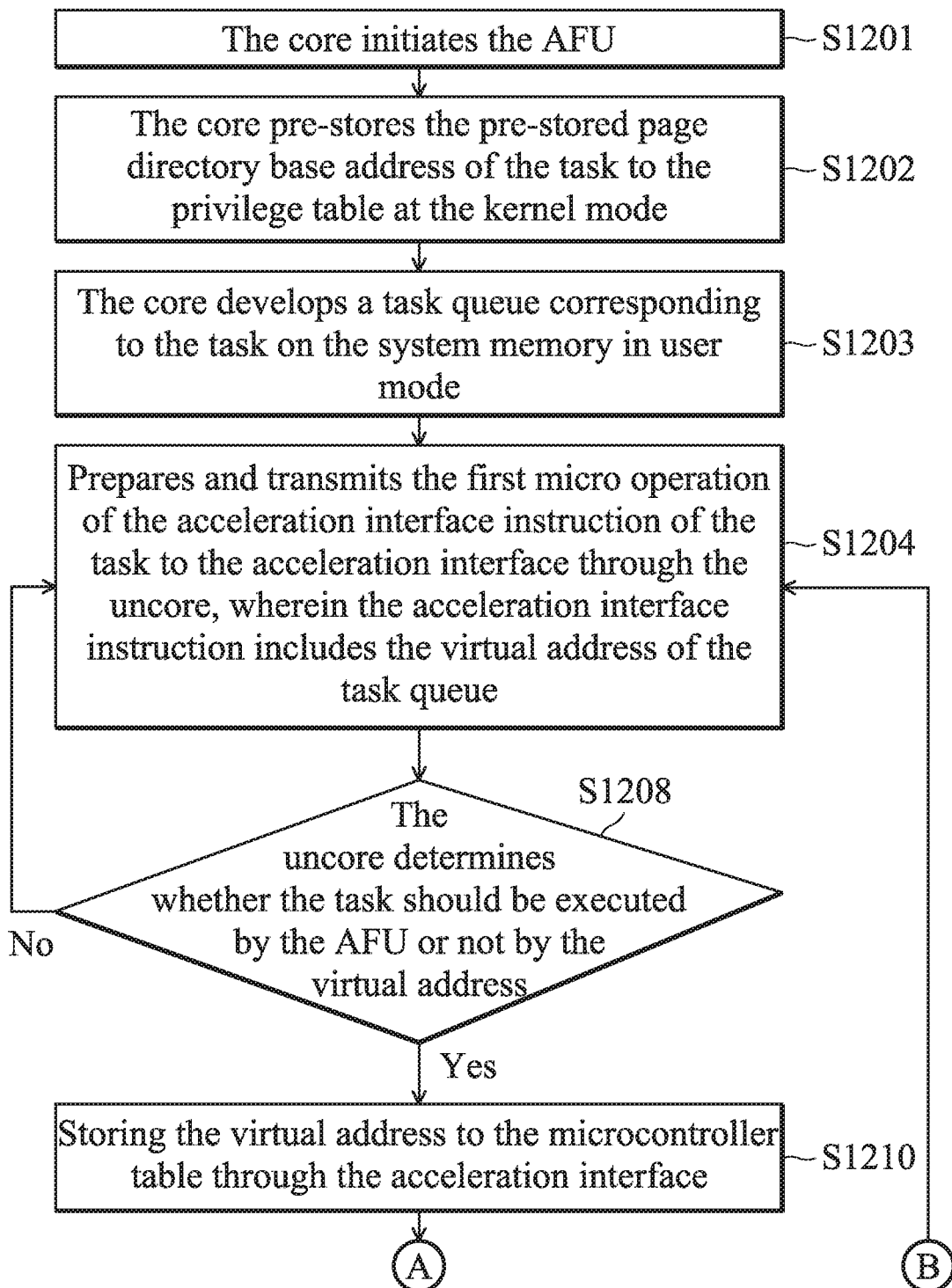
FIGS. 12A and 12B are schematics of a heterogeneous processor acceleration method according to an embodiment of the invention.
Figure 12B:
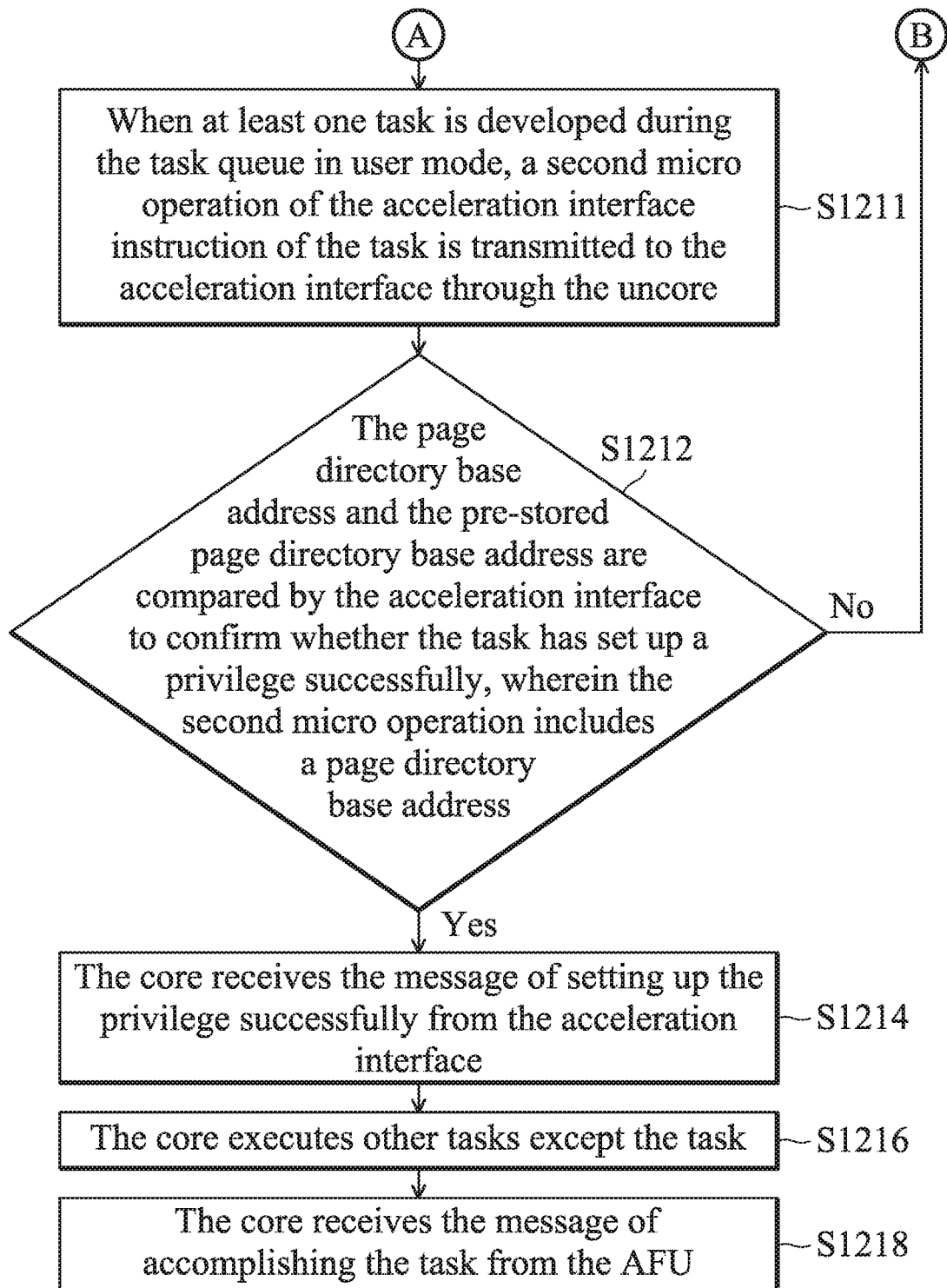

The various acceleration, scheduling and access methods of various processing systems and heterogeneous processors of the present invention are illustrated in detail below. FIGS. 12A and 12B are schematics of a heterogeneous processor acceleration method according to an embodiment of the invention, which is mainly executed by the core 120. In step S1201, the core 120 initiates the AFU 110. Specifically, the core 120 determines whether the processing system 10 includes an available AFU 110 or not. If yes, the AFU 110 will be initiated; if not, the heterogeneous processor acceleration method ends. In step S1202, the core 120 pre-stores the pre-stored page directory base address of the task to the privilege table 134 in kernel mode. In step S1203, the core 120 develops a task queue corresponding to the task on the system memory 160 in user mode.

Afterwards, in step S1204, the core 120 prepares and transmits the first micro operation of the acceleration interface instruction of the task to the acceleration interface 130 through the uncore 180. The above acceleration interface instruction includes the virtual address of the task queue.

In step S1208, the uncore 180 determines whether the task should be executed by the AFU 110 or not by the virtual address. If it is determined that the task should not be executed by the AFU 110, step S1204 will be executed again. If it is determined that the task should be executed by the AFU 110, step S1210 will be executed to store the virtual address in the microcontroller table through the acceleration interface 130. In step S1211, when at least one task (such as pushing at least one command packet) is developed during the task queue in user mode, a second micro operation of the acceleration interface instruction of the task is transmitted to the acceleration interface 130 through the uncore 180. The above second micro operation includes a page directory base address.

In step S1212, the page directory base address and the pre-stored page directory base address are compared by the acceleration interface 130 to confirm whether the task has set up a privilege successfully, wherein the second micro operation includes the above mentioned page directory base address. If the task has not set up the privilege successfully, step S1204 will be executed again; if the task has set up the privilege successfully, step S1214 will be executed so that the core 120 receives the message from the acceleration interface 130 indicating that the task has set up the privilege successfully. Afterwards, in step S1216, the core 120 executes tasks other than this task. In step S1218, the core 120 receives a message indicating that the task from the AFU 110 has been accomplished.

Figure 13:
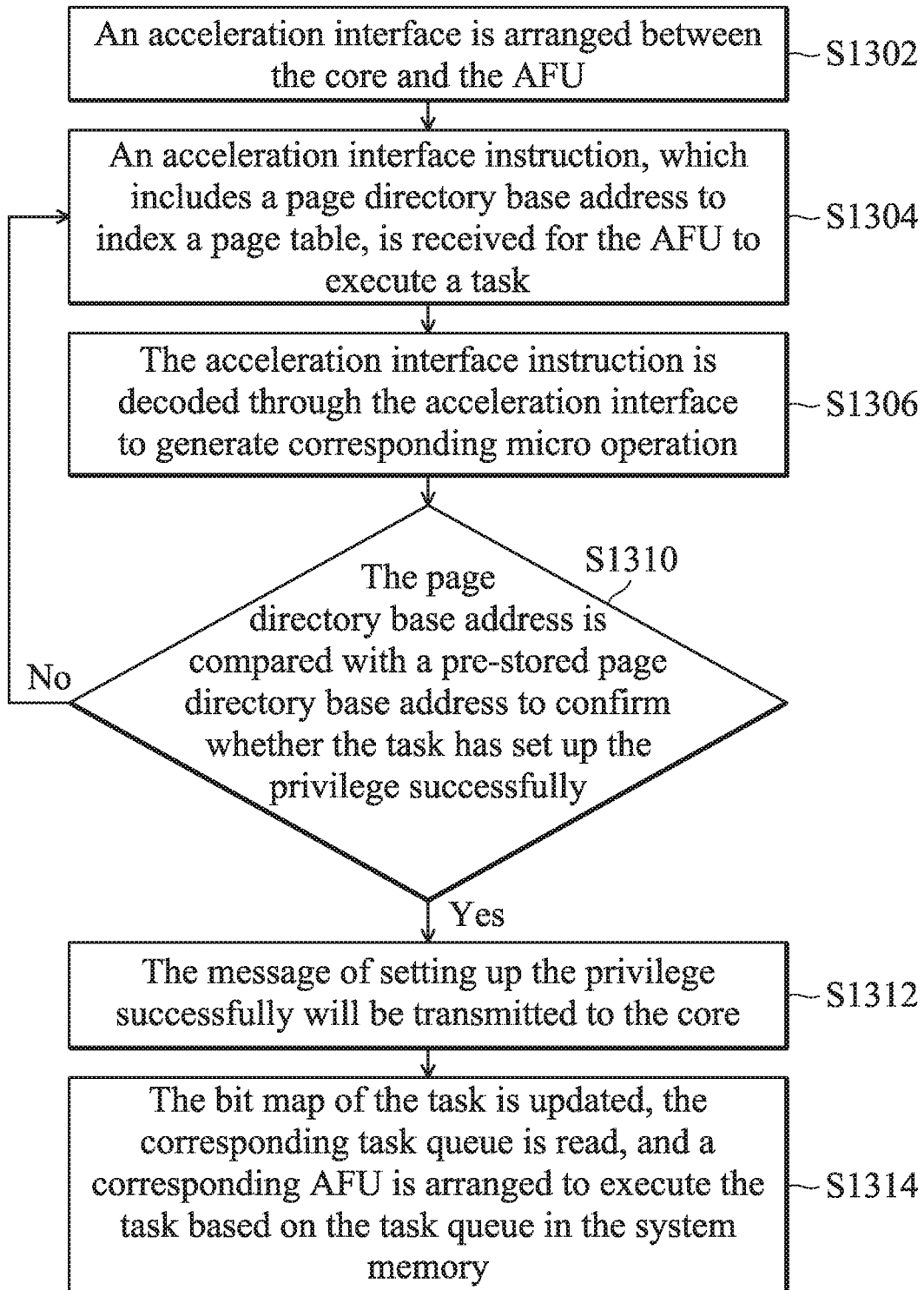
FIG. 13 is schematic diagram that illustrates a heterogeneous processor acceleration method according to another embodiment of the invention.

FIG. 13 is schematic diagram that illustrates a heterogeneous processor acceleration method according to another embodiment of the invention, which is mainly executed by the acceleration interface 130. In step S1302, an acceleration interface 130 is arranged between the core 120 and the AFU 110. In step S1304, an acceleration interface instruction, which includes a page directory base address to index a page table, is received for the AFU 110 to execute a task. In step S1306, the acceleration interface instruction is decoded through the acceleration interface 130 to generate a corresponding micro operation.

Afterwards, in step S1310, the page directory base address is compared with a pre-stored page directory base address to confirm whether the task has set up the privilege successfully. If the task has not set up the privilege successfully, step S1304 will be executed again; if the task has set up the privilege successfully, step S1312 will be executed so that a message will be transmitted to the core 120 indicating that the task has set up the privilege successfully. Afterwards, in step S1314, the bit map 137 of the task is updated, the corresponding task queue is read, and a corresponding AFU 110 is arranged to execute the task based on the task queue in the system memory 160.

Figure 14:
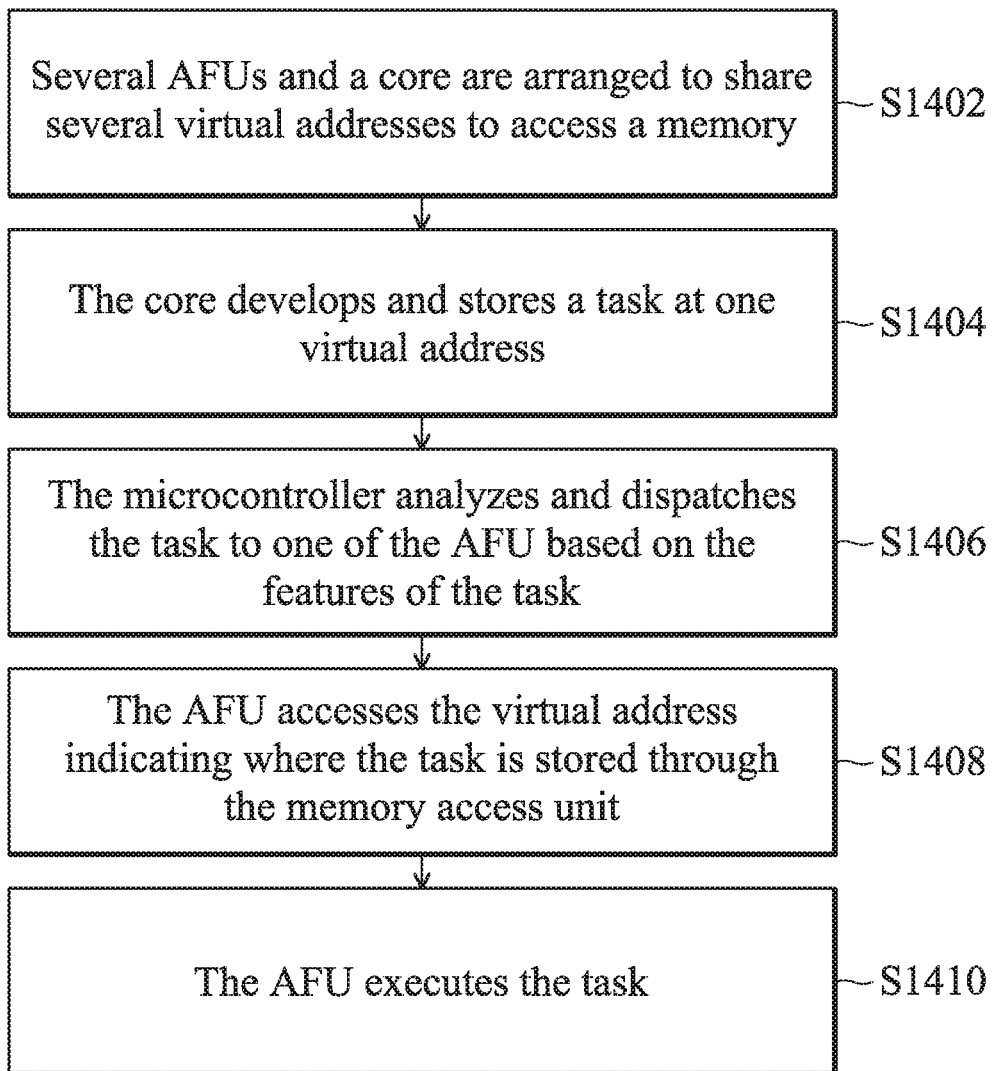
FIG. 14 is a memory access method of a processing system for dispatching tasks according to an embodiment of the invention.

FIG. 14 is a memory access method of a processing system for dispatching tasks according to an embodiment of the invention. In step S1402, several AFUs 110 and a core 120 are arranged to share several virtual addresses to access a memory (i.e., the system memory 160). In step S1404, the core 120 develops and stores a task in one virtual address. As shown in FIG. 12A, developing a task means pushing a command packet into a task queue with a virtual address as the queue base address. In step S1406, the microcontroller 140 analyzes and dispatches the task to one of the AFUs 110 based on the features of the task. Afterwards in step S1408, the AFU 110 accesses the virtual address indicating where the task is stored through the memory access unit 150. In step S1410, the AFU 110 executes the task.

It should be noted that if the AFU 110 and core 120 do not share several virtual addresses for accessing memory, after the AFU 110 accomplishes the task, it should write the data to the hard disk or system memory 160. Afterwards, the core 120 reads the data, and it takes two data-moving processes from the hard disk to the system memory 160. On the contrary, AFU 110 and core 120 are arranged by the present invention to share several virtual addresses for accessing memory to simplify and accelerate the data moving process.

Figure 15:
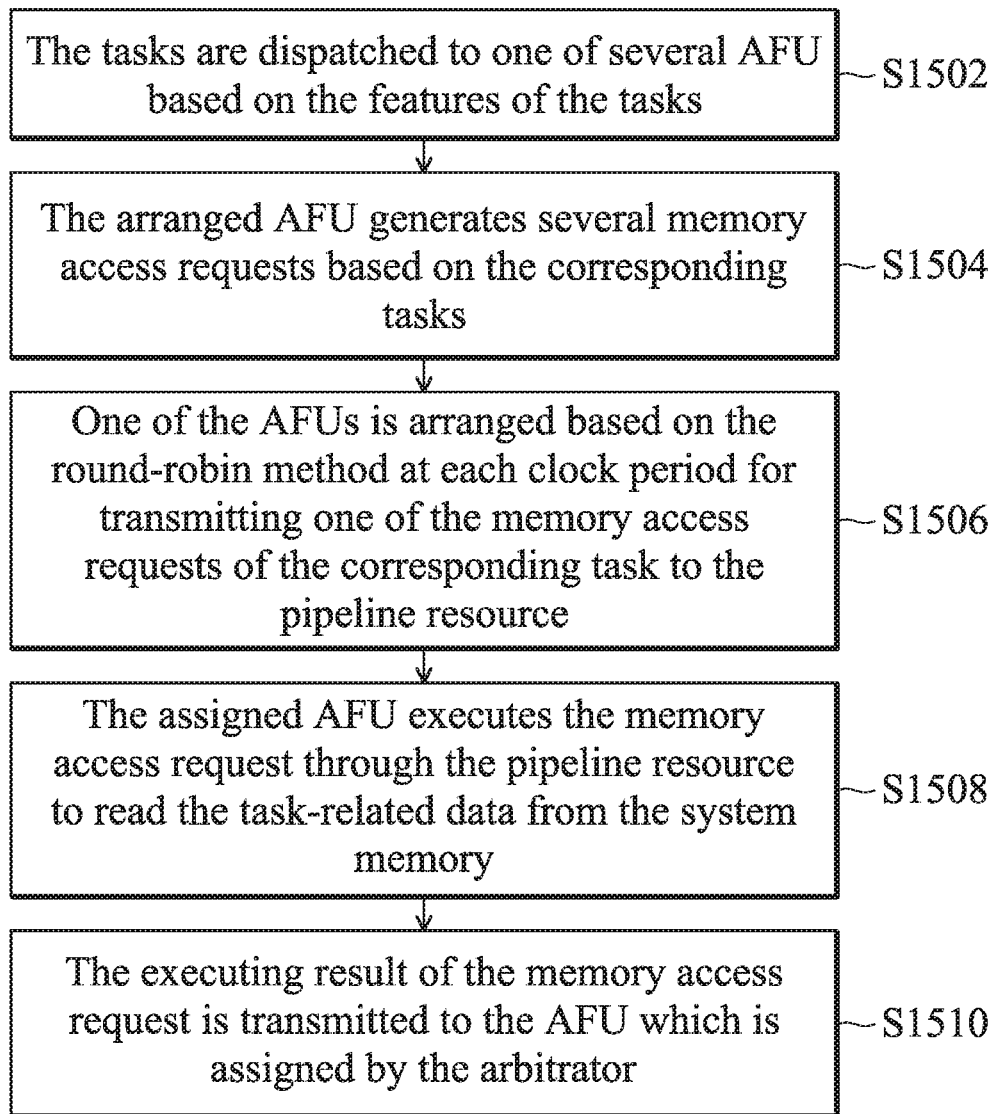
FIG. 15 is a memory access method which utilizes a round-robin method according to an embodiment of the invention.

FIG. 15 is a memory access method which utilizes a round-robin method according to an embodiment of the invention. In step S1502, the tasks are dispatched to one of several AFUs 110 based on the features of the tasks. In step S1504, the arranged AFU 110 generates several memory access requests based on the corresponding tasks. In step S1506, one of the AFUs 110 is arranged based on the round-robin method at each clock period for transmitting one of the memory access requests of the corresponding task to the pipeline resource 282.

Afterwards, in step S1508, the assigned AFU 110 executes the memory access request through the pipeline resource 282 to read the task-related data from the system memory 160. In step S1510, the executing result of the memory access request is transmitted to the AFU 110 which is assigned by the arbitrator 281. The arrangement of the above arbitrator 281 and the pipeline resource 282 is shown in FIG. 6, and will not repeated again here.

Figure 16:
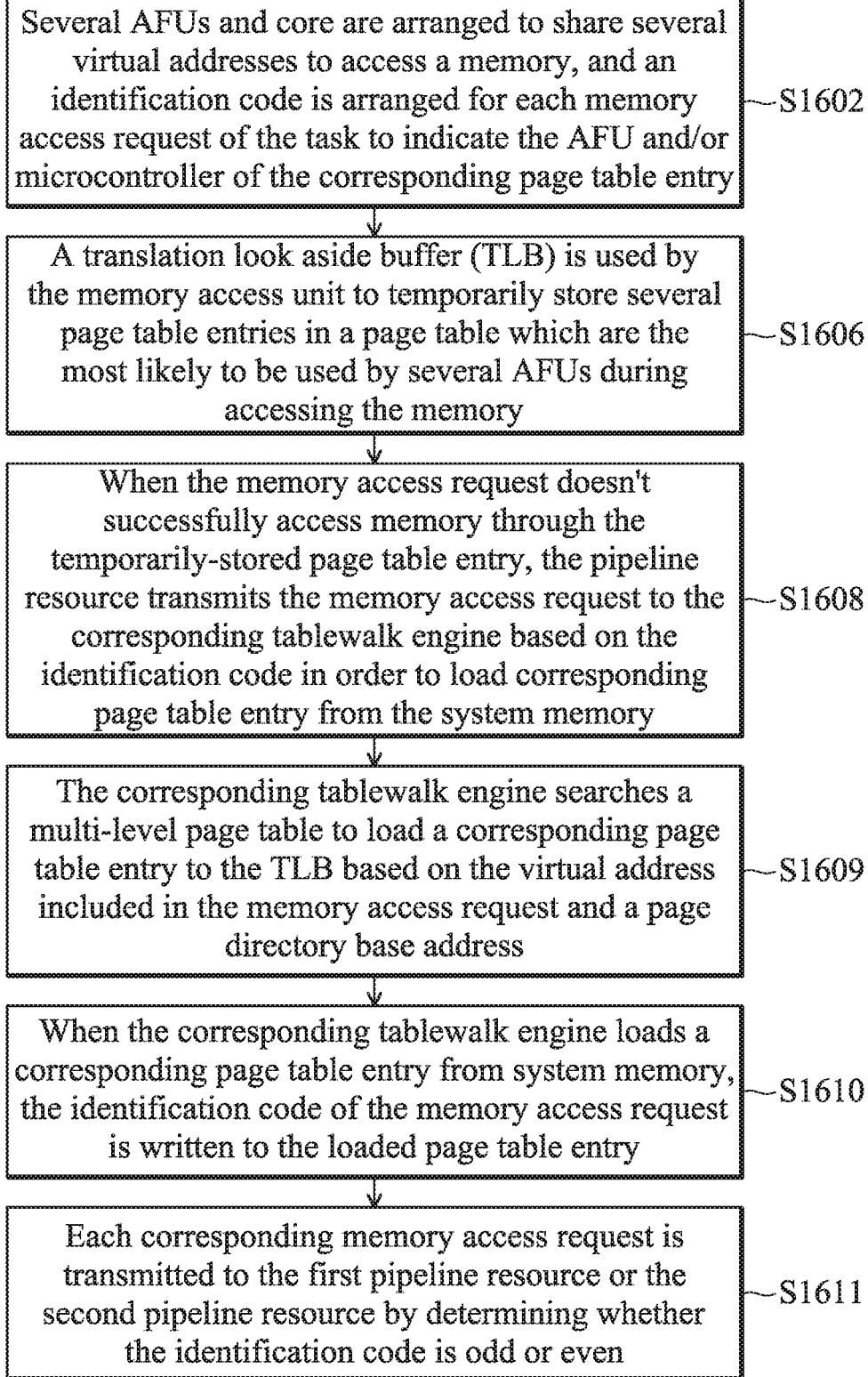
FIG. 16 is a memory access method which utilizes a round-robin method according to another embodiment of the invention.

FIG. 16 illustrates a memory access method which utilizes a round-robin method according to another embodiment of the invention. In step S1602, several AFUs 110 and cores 120 are arranged to share several virtual addresses to access a memory (i.e., the system memory 160), and an identification code is arranged for each memory access request of the task to indicate the AFU 110 and/or microcontroller 140 of the corresponding page table entry. In other words, each memory access request has its own exclusive identification code to rapidly inquire into the corresponding memory access request subject (the AFU 110 and/or microcontroller 140).

In step S1606, a translation look aside buffer (TLB) is used by the memory access unit 150 to temporarily store several page table entries in a page table which are the most likely to be used by several AFUs 110A~110F during accessing the memory. Specifically, each page table entry stores a mapping between a virtual address and a physical address. In step S1608, when the memory access request is not successfully accessing the memory by the temporarily-stored page table entry, the pipeline resource 282 transmits the memory access request to the corresponding tablewalk engines 209A~209E based on the identification code in order to load corresponding page table entry from the system memory 160. In other words, as shown in FIG. 5 and FIG. 6, the AFU 110A~110D and microcontroller 140 have their own exclusive and corresponding schedulers 210A~210E and tablewalk engines 209A~209E.

Afterwards, in step S1609, the corresponding one of the tablewalk engines 209A~209E searches a multi-level page table to load a corresponding page table entry to the TLB based on the virtual address included in the memory access request and a page directory base address. In step S1610, when the corresponding one of the tablewalk engines 209A~209E loads a corresponding page table entry from system memory 160, the identification code of the memory access request is written to the loaded page table entry. In step S1611, each corresponding memory access request is transmitted to the first pipeline resource 282A or the second pipeline resource 282B by determining whether the identification code is odd or even. Therefore, by the distributing arrangement of the first pipeline resource 282A and the second pipeline resource 282B associated with the above identification code, the processing speed of the memory access request can be accelerated. In addition, because the page table entry from the system memory 160 has been filled with the identification code, the identification code can determine whether or not the filled page table entry corresponds to the memory access request.

Figure 17:
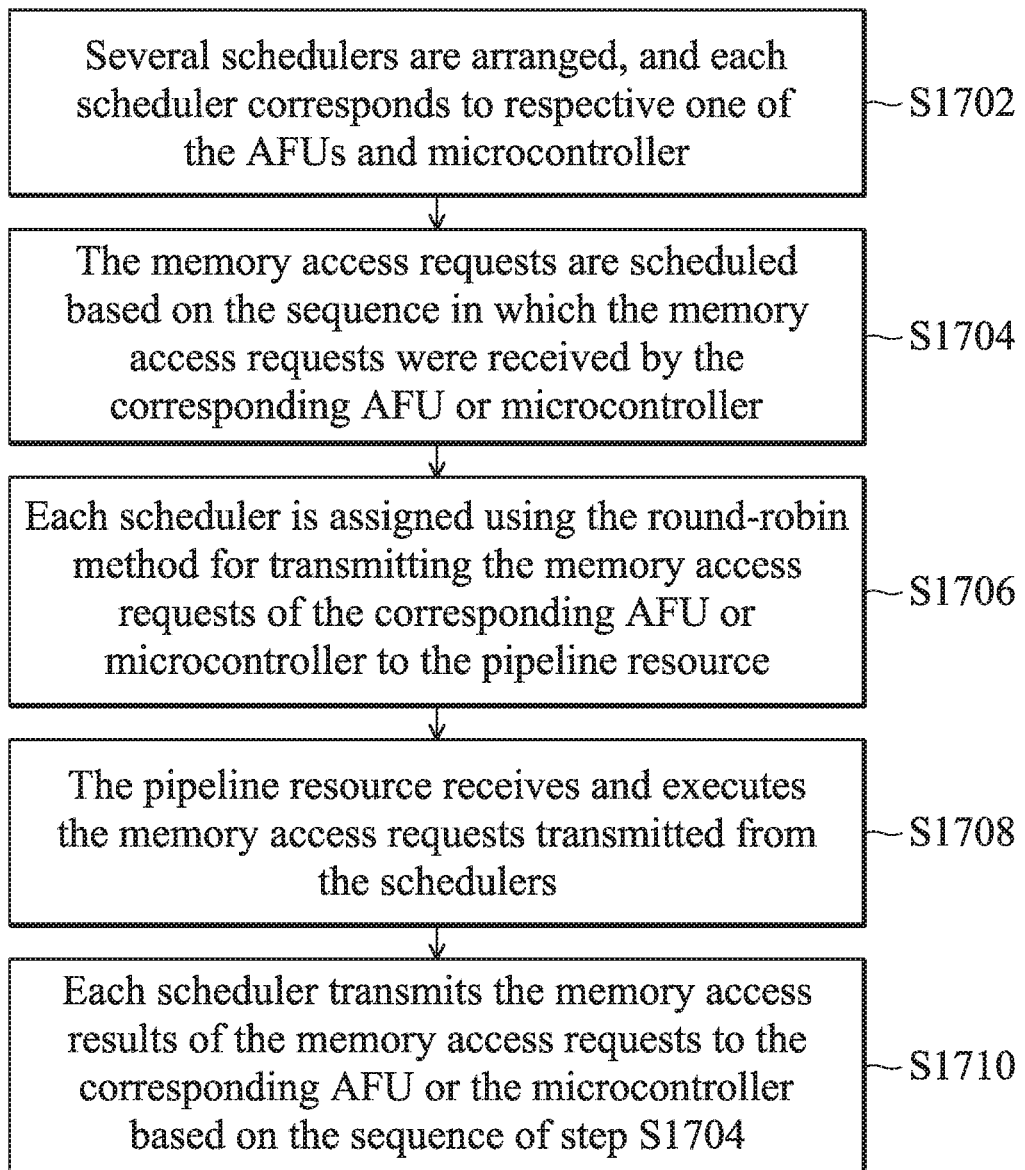
FIG. 17 is a memory access method of a processing system for scheduling according to an embodiment of the invention.

FIG. 17 is a memory access method of a processing system for scheduling according to an embodiment of the invention. In step S1702, several schedulers 210A~210E are arranged. Each scheduler corresponds to respective one of the AFUs 110 and microcontroller 140. In step S1704, the memory access requests are scheduled based on the sequence in which the memory access requests were received by the corresponding AFU 110 or microcontroller 140. In step S1706, each scheduler 210A~210E is assigned using the round-robin method for transmitting the memory access requests of the corresponding AFU 110 or microcontroller 140 to the pipeline resource 282. In step S1708, the pipeline resource 282 receives and executes the memory access requests transmitted from the schedulers 210A~210E. In step S1710, each scheduler 210A~210E transmits the memory access results of the memory access requests to the corresponding AFU 110 or the microcontroller 140 based on the sequence of step S1704.

Figure 18:
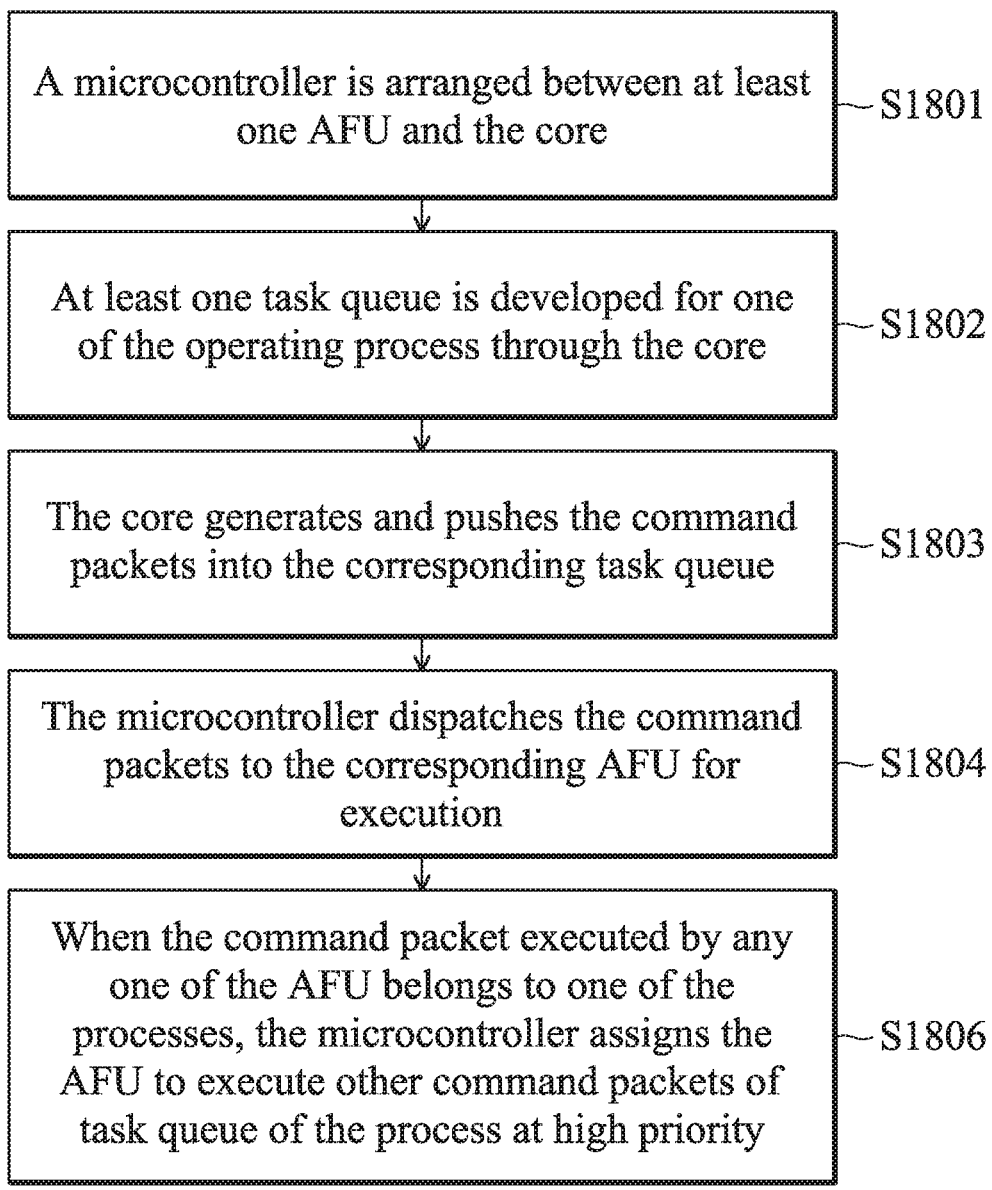
FIG. 18 is a processor acceleration method for assigning and dispatching tasks according to an embodiment of the invention.

FIG. 18 is a processor acceleration method for assigning and dispatching tasks according to an embodiment of the invention. In step S1801, a microcontroller 140 is arranged between at least one AFU 110 and the core 120. In step S1802, at least one task queue is developed for one of the operating processes through the core 120.

Afterwards, in step S1803, the core 120 generates and pushes the command packets into the corresponding task queue. In step S1804, the microcontroller 140 dispatches the command packets to the corresponding AFU 110 for execution. In step S1806, when the command packet executed by any of the AFUs 110 belongs to one of the processes, the microcontroller 140 assigns the AFU 110 to execute other command packets of the task queue of the process at a high priority. It should be noted that the processing method of FIG. 18 does not limit the number of AFUs 110. The processor acceleration method of the invention may be applied to a processing system 10 that includes one or several AFUs 110 for assigning and dispatching tasks.

Figure 19:
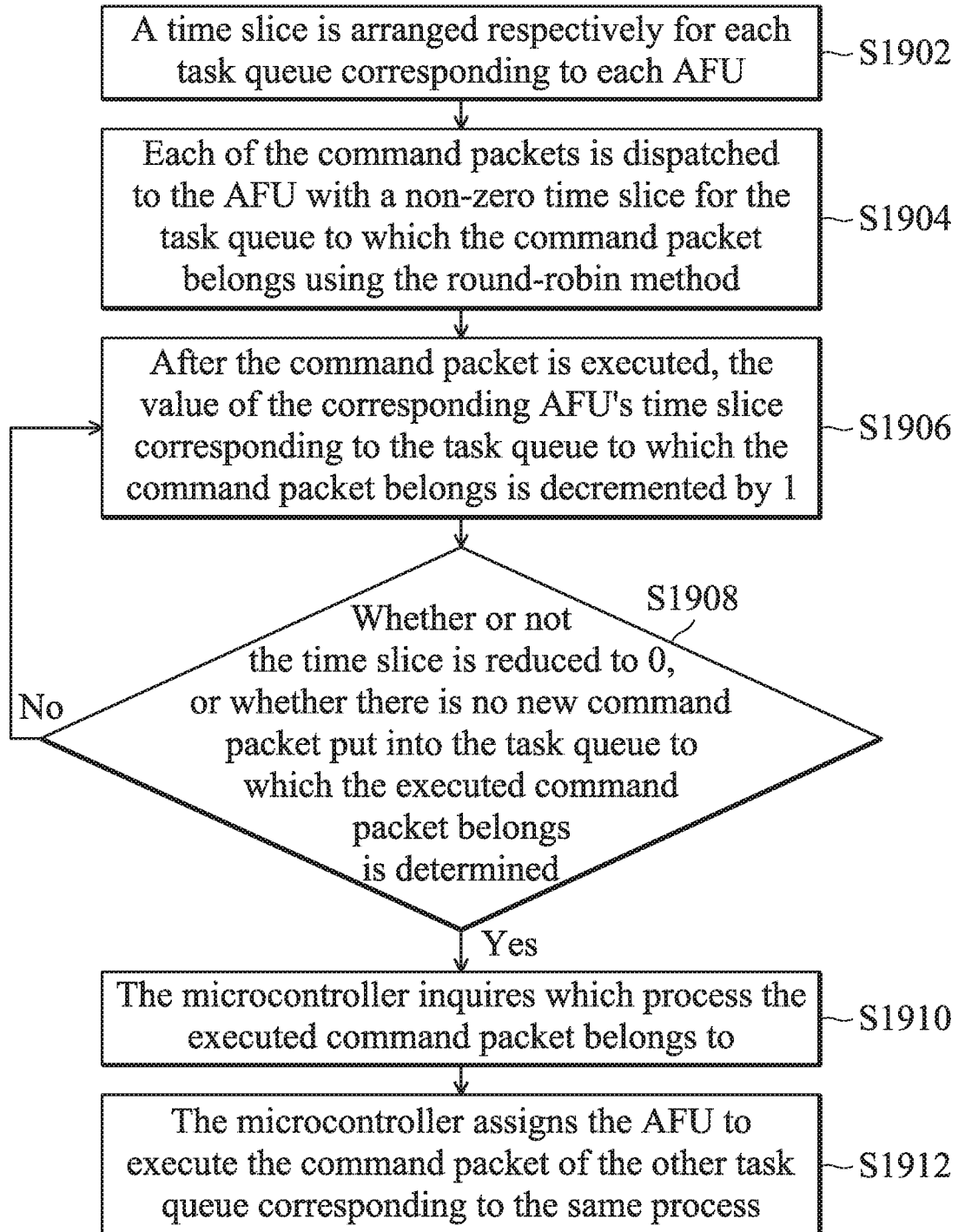
FIG. 19 is a processor acceleration method for assigning and dispatching tasks according to another embodiment of the invention.

FIG. 19 is a processor acceleration method for assigning and dispatching tasks according to another embodiment of the invention. In step S1902, a time slice is arranged for each respective task queue corresponding to each AFU 110. In step S1904, each of the command packets is dispatched to the AFU with a non-zero time slice for the task queue to which the command packet belongs using the round-robin method. In step S1906, after the command packet is executed, the value of the corresponding AFU's time slice corresponding to the task queue to which the command packet belongs is decremented by 1.

In step S1908, a determination is made as to whether or not the time slice is reduced to 0, or whether there is no new command packets put into the task queue to which the executed command packet belongs. When the time slice is not reduced to 0 or there is new command packets in the task queue to which the executed command packet belongs, step S1906 is executed again. When the time slice is reduced to 0 or there is no new command packet that has been put into the task queue to which the executed command packet belongs, step S1910 is executed. In step S1910, the microcontroller 140 inquires which process the executed command packets belongs to. In step S1912, the microcontroller 140 assigns the AFU to execute the command packet of the other task queue corresponding to the same process. It should be noted that the processing method illustrated in FIG. 19 does not limit the number of AFUs 110. A processing system 10 that includes one or several AFUs 110 can use the processor acceleration method of the invention for assigning and dispatching tasks.

Figure 20A:
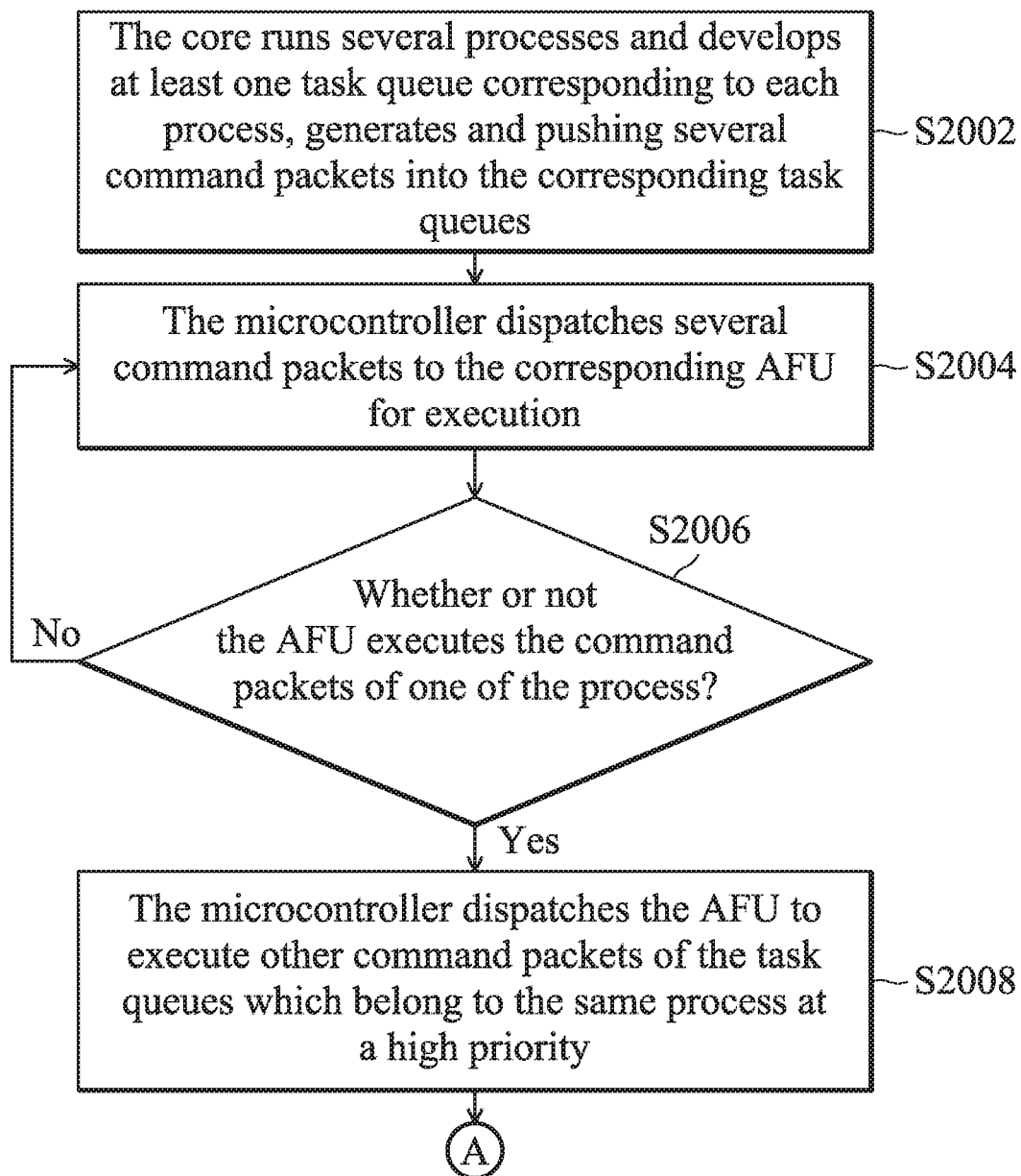
FIGS. 20A and 20B are processor acceleration methods for assigning and dispatching tasks according to another embodiment of the invention.
Figure 20B:
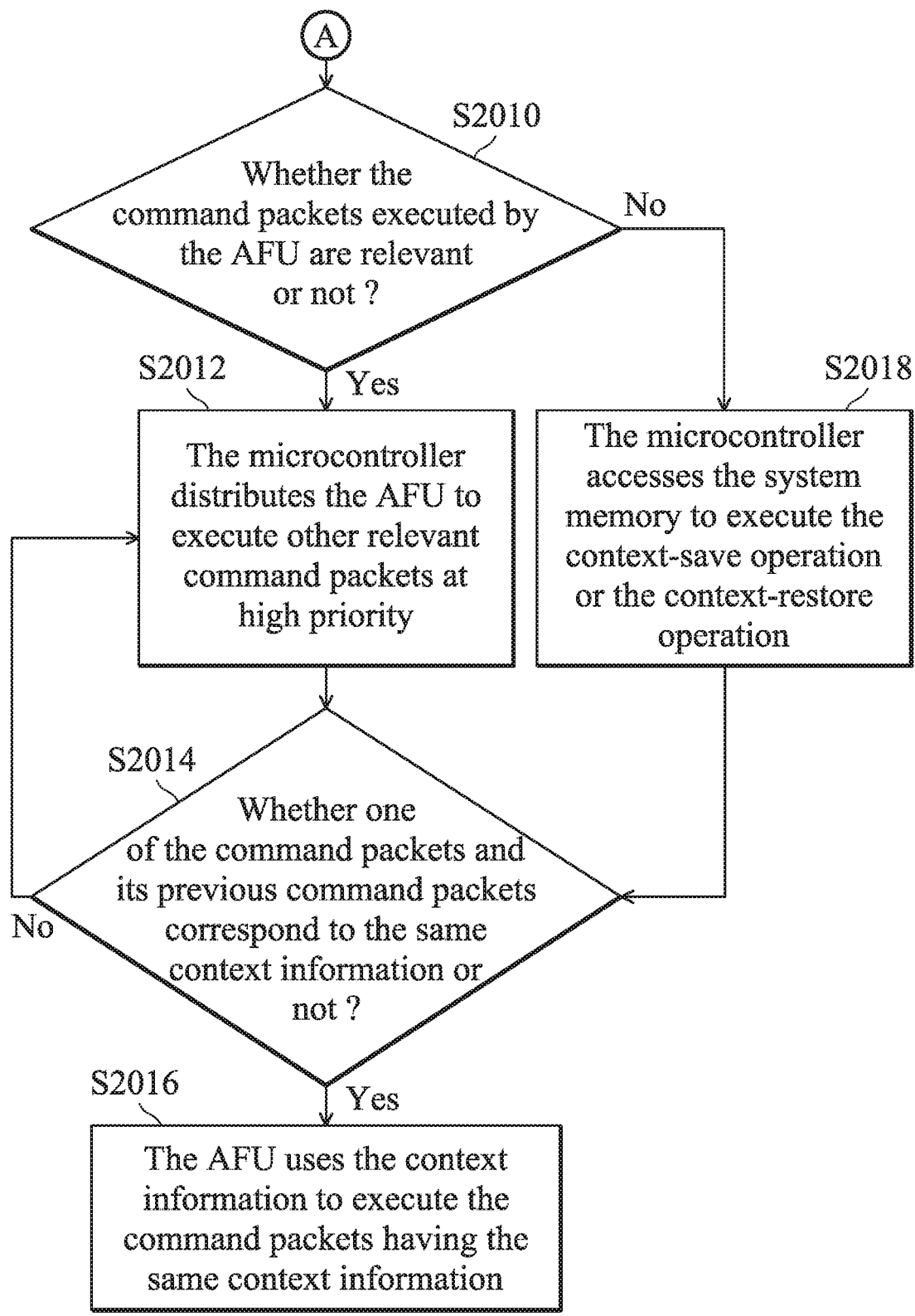

FIGS. 20A and 20B are processor acceleration methods for assigning and dispatching tasks according to another embodiment of the invention. In step S2002, the core 120 runs several processes and develops at least one task queue corresponding to each process, and generates and pushes several command packets into the corresponding task queues. In step S2004, the microcontroller 140 dispatches several command packets to the corresponding AFU 110 for execution.

Afterwards, in step S2006, whether or not the AFU 110 executes the command packets of one of the processes is determined. If the AFU 110 does not execute the command packets of the process, step S2004 will be executed again. If the AFU 110 executes the command packets of the process, step S2008 will be executed so that the microcontroller 140 dispatches the AFU 110 to execute other command packets of the task queues which belong to the same process at a high priority.

In step S2010, whether the command packets executed by the AFU 110 are relevant or not is determined. If the command packets executed by the AFU 110 are relevant, step S2012 will be executed so that the microcontroller 140 distributes the AFU 110 to execute other relevant command packets at a high priority. If the command packets executed by the AFU 110 are not relevant, step S2018 will be executed so that the microcontroller 140 accesses the system memory 160 to execute the context-save operation or the context-restore operation.

Afterwards, in step S2014, whether or not one of the command packets and its previous command packets correspond to the same context information is determined. If the command packets do not have the same context information as the previous command packets, step S2012 will be executed. If the command packets have the same context information as the previous command packets, step S2016 will be executed so that the AFU 110 uses the context information to execute the command packets having the same context information. The context information can be temporarily stored in the internal RAM 116 of the AFU 110. It should be noted that the processing method of FIG. 20 does not limit the number of AFUs 110. A processing system 10 with one or several AFUs 110 can use the processor acceleration method of the invention for assigning and dispatching tasks.

Figure 21:
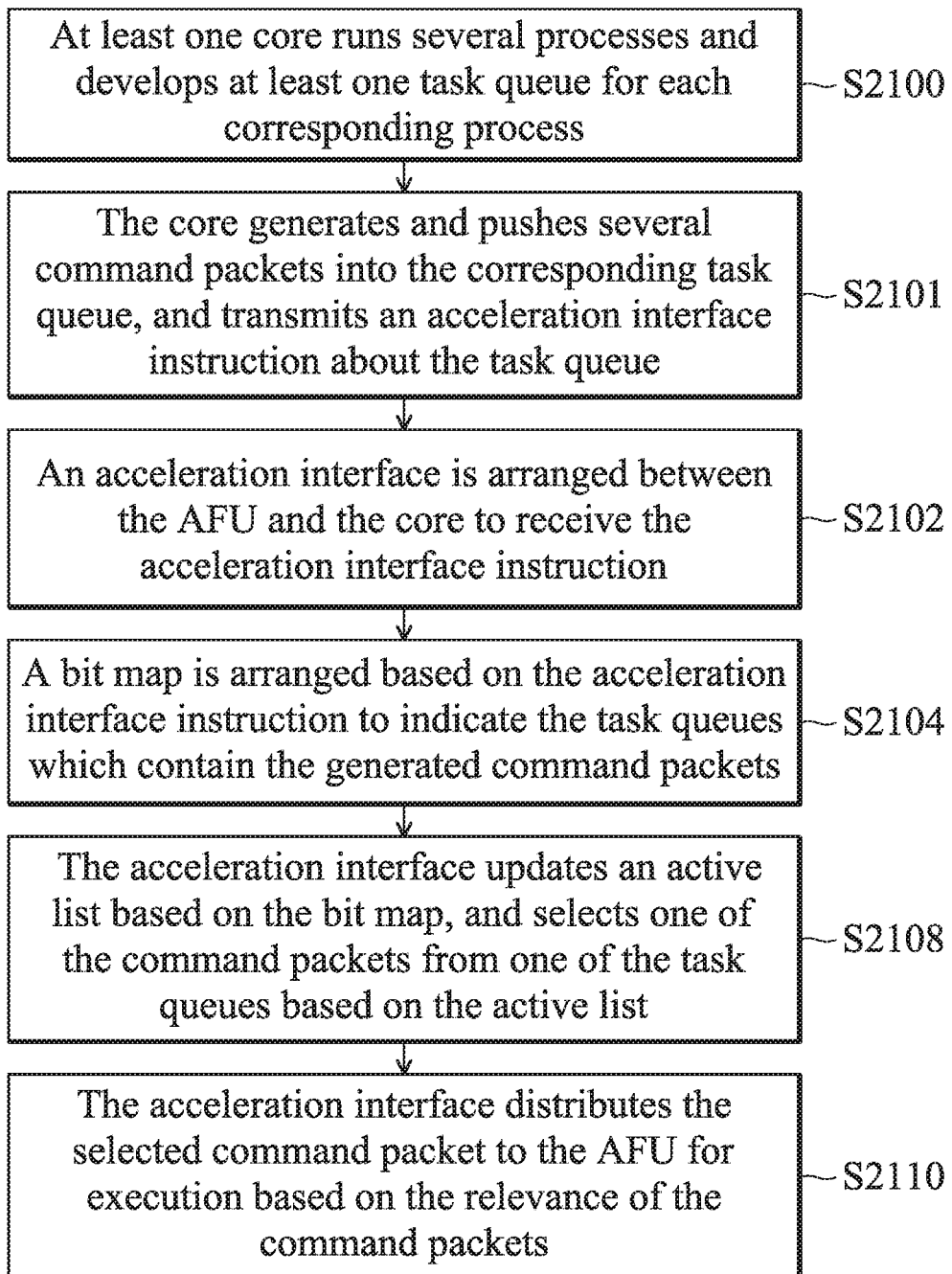
FIG. 21 is a processor acceleration method for dispatching tasks according to an embodiment of the invention.

FIG. 21 is a processor acceleration method for dispatching tasks according to an embodiment of the invention. In step S2100, at least one core runs several processes and develops at least one task queue for each corresponding process. In step S2101, the core 120 generates and pushes several command packets into the corresponding task queue, and transmits an acceleration interface instruction about the task queue. In step S2102, an acceleration interface 130 is arranged between the AFU 110 and the core 120 to receive the acceleration interface instruction.

Afterwards, in step S2104, a bit map 137 is arranged based on the acceleration interface instruction to indicate the task queues which contain the generated command packets. In step S2108, the acceleration interface 130 updates an active list 147 based on the bit map 137, and selects one of the command packets from one of the task queues based on the active list 147. Afterwards, in step S2110, the acceleration interface 130 distributes the selected command packet to the AFU 110 for execution based on the relevance of the command packets.

Figure 22:
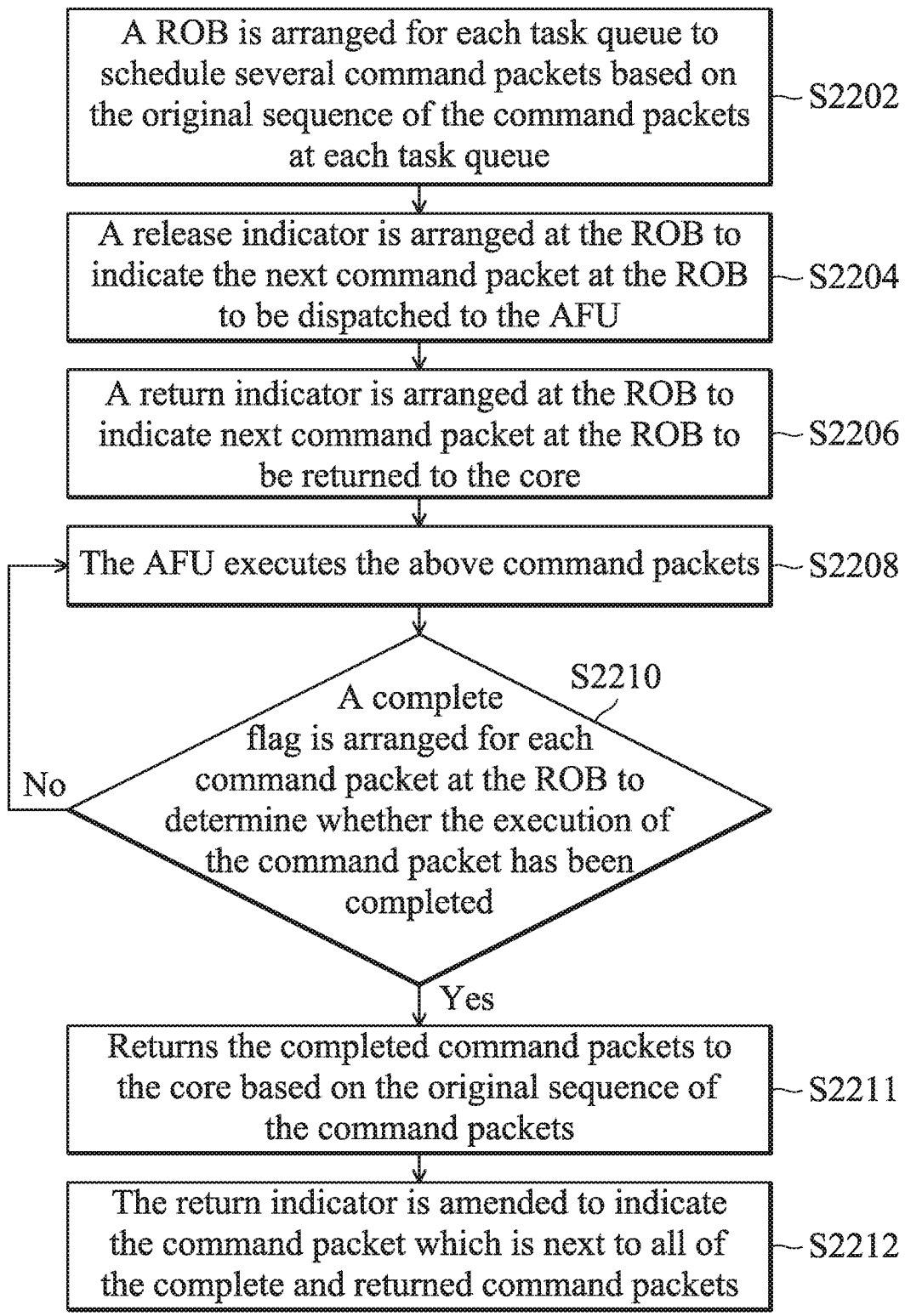
FIG. 22 is a processor acceleration method for dispatching tasks according to another embodiment of the invention.

FIG. 22 is a processor acceleration method for dispatching tasks according to another embodiment of the invention. In step S2202, a ROB is arranged for each task queue to schedule several command packets based on the original sequence of the command packets in each task queue. In step S2204, a release indicator is arranged at the ROB to indicate the next command packet at the ROB to be dispatched to the AFU 110. In step S2206, a return indicator is arranged at the ROB to indicate the next command packet at the ROB to be returned to the core 120.

In step S2208, the AFU 110 executes the above command packets. In step S2210, a complete flag is arranged for each command packet at the ROB to determine whether the execution of the command packet has been completed. If the execution of the command packet has not been completed, step S2208 will be executed so that the AFU 110 executes the above command packets. If the execution of the command packet has been completed, step S2211 will be executed to return the completed command packets to the core 120 based on the original sequence of the command packets. Afterward, in step S2212, the return indicator is amended to indicate the command packet which is next to all of the completed and returned command packets.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. The term "access" of the specification and the claims is the abbreviation of term "memory access", which includes loading data from the system storage and/or storing data to the system storage. In addition, the "system storage" can also be "memory" in other embodiments.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing system for dispatching tasks, comprising:
at least one core, used to run a plurality of processes and develop at least one task queue corresponding to each of the processes, wherein the core generates several command packets and pushes them into the corresponding task queues;
at least one accelerator function unit (AFU), executing the command packets; and
an acceleration interface, arranged between the core and the AFU to receive an acceleration interface instruction from the core, and establish a bit map based on the acceleration interface instruction, wherein the bit map is used to indicate which task queue contains the command packets that have been generated;
wherein the acceleration interface further comprises:
an accelerator interface front end, receiving and decoding the acceleration interface instruction to set the bit map, wherein the acceleration interface instruction is transmitted after the core generates the new command packets and pushes them into the corresponding task queues; and
an accelerator interface back end, updating an active list based on the bit map, wherein the accelerator interface back end selects one of the command packets from one of the task queues based on the active list, and dispatches the selected command packet to the corresponding AFU for execution.

2. The processing system in claim 1, wherein the active list is used to indicate the task queues that contain the command packets.

3. The processing system in claim 2, wherein the active list is used to further indicate the processes corresponding to the task queues that contain the command packets.

4. The processing system in claim 1, wherein each of the task queues has a reorder buffer to schedule the command packets based on an original sequence of the command packets at each of the task queues, and the AFU returns the executed command packets to the core based on the original sequence.

5. The processing system in claim 4, wherein time at which each of the command packets is executed by the AFU is different.

6. The processing system in claim 4, wherein the ROB is arranged at a SRAM of the acceleration interface.

7. The processing system in claim 4, wherein when the acceleration interface dispatches some of the command packets to the AFU for execution simultaneously, the acceleration interface returns the executed command packets simultaneously to the core according to the original sequence.

8. The processing system in claim 4, wherein the ROB further includes a release indicator and a return indicator, the release indicator is used to indicate the next command packet to be dispatched to the AFU for execution, and the return indicator is used to indicate the next command packet to be returned to the core.

9. The processing system in claim 8, wherein the ROB stores a complete flag corresponding to each of the command packets to indicate whether execution of each corresponding command packet has been completed or not.

10. A task dispatching method, applicable for at least one core, at least one accelerator function unit (AFU), and an acceleration interface, the task dispatching method comprising:
running a plurality of processes and developing at least one task queue corresponding to each of the processes;
generating several command packets and pushing them into the corresponding task queues;
receiving an acceleration interface instruction about the task queue from the core; and establishing a bit map based on the acceleration interface instruction, wherein the bit map is used to indicate which task queue contains the command packets that have been generated;

receiving and decoding the acceleration interface instruction to set the bit map, wherein the acceleration interface instruction is transmitted after the core generates the new command packets and pushes them into the corresponding task queues;

updating an active list based on the bit map;

selecting one of the command packets from one of the task queues based on the active list; and dispatching the selected command packet to the corresponding AFU for execution.

11. The task dispatching method in claim 10, wherein the active list is used to indicate the task queues that contain the command packets.

12. The task dispatching method in claim 11, wherein the active list is used to further indicate the processes corresponding to the task queues that contain the command packets.

13. The task dispatching method in claim 10, further comprising:

arranging a reorder buffer for each of the task queues;

scheduling the command packets based on an original sequence of the command packets at each of the task queues; and returning the command packets which have been executed to the core based on the original sequence.

14. The task dispatching method in claim 13, wherein time at which each of the command packets is executed by the AFU is different.

15. The task dispatching method in claim 13, wherein the ROB is arranged at a SRAM of the acceleration interface.

16. The task dispatching method in claim 13, wherein when the acceleration interface dispatches some of the command packets to the AFU for execution simultaneously, the method further includes returning the executed command packets simultaneously to the core according to the original sequence.

17. The task dispatching method in claim 13, further comprising arranging a release indicator and a return indicator for the ROB, wherein the release indicator is used to indicate the next command packet to be dispatched to the AFU for execution, and the return indicator is used to indicate the next command packet to be returned to the core.

18. The task dispatching method in claim 17, further comprising storing a complete flag corresponding to each of the command packets to indicate whether execution of each corresponding command packet has been completed or not.

* * * * *